United States Patent
Natanzon et al.

(10) Patent No.: US 10,990,369 B2
(45) Date of Patent: Apr. 27, 2021

(54) REPURPOSING SERVERLESS APPLICATION COPIES

(71) Applicant: EMC IP Holding Company LLC, Hopkinton, MA (US)

(72) Inventors: Assaf Natanzon, Tel Aviv (IL); Amit Lieberman, Kefar Sava (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 70 days.

(21) Appl. No.: 15/966,259

(22) Filed: Apr. 30, 2018

(65) Prior Publication Data
US 2019/0332366 A1 Oct. 31, 2019

(51) Int. Cl.
*G06F 8/60* (2018.01)

(52) U.S. Cl.
CPC ..................... *G06F 8/60* (2013.01)

(58) Field of Classification Search
USPC ........................................................ 717/177
See application file for complete search history.

(56) References Cited

U.S. PATENT DOCUMENTS

| | | | | |
|---|---|---|---|---|
| 5,315,508 A * | 5/1994 | Bain | ..................... | G06K 17/00 705/28 |
| 8,843,822 B2 * | 9/2014 | Claux | ..................... | G06Q 10/10 715/273 |
| 8,997,081 B1 * | 3/2015 | Manion | ..................... | G06F 8/65 717/168 |
| 9,727,429 B1 * | 8/2017 | Moore | ..................... | G06F 11/203 |
| 10,146,675 B1 * | 12/2018 | Shemer | ............... | G06F 11/3688 |
| 10,268,477 B1 * | 4/2019 | Desai | ......................... | G06F 8/65 |
| 10,303,464 B1 * | 5/2019 | Wolfson | .................... | G06F 8/71 |
| 2002/0019972 A1 * | 2/2002 | Grier | ......................... | G06F 8/71 717/122 |
| 2005/0034122 A1 * | 2/2005 | Kung | .................. | G06F 11/1433 717/177 |
| 2006/0143464 A1 * | 6/2006 | Ananthanarayanan | ..................... | G06F 21/6218 713/182 |
| 2008/0201707 A1 * | 8/2008 | Lavery | ..................... | G06F 8/60 717/178 |
| 2009/0300215 A1 * | 12/2009 | Gnanasambandam | ..................... | H04L 67/104 709/242 |
| 2010/0169894 A1 * | 7/2010 | Sheaffer | .................. | G06F 9/528 718/106 |
| 2011/0225459 A1 * | 9/2011 | Fahrig | .................. | G06F 11/366 714/37 |

(Continued)

*Primary Examiner* — Jason D Mitchell
(74) *Attorney, Agent, or Firm* — Staniford Tomita LLP

(57) ABSTRACT

A selection is received of a copy of an application backed up from a first FaaS environment for deployment into a second FaaS environment. An application manifest used to backup the application is accessed. The manifest specifies application functions, backend services, and application function mappings. An application function interacts with a backend service in executing the application. An application function mapping includes a condition under which the application function is invoked. The copy of the application is restored into the second FaaS environment. A condition specified in the restored version of the application function mapping is changed. Based on the changed condition, the restored version of the application function is invoked when the restored version of the backend service performs an operation, and the application function of the application corresponding to the restored version of the application function is not invoked.

20 Claims, 11 Drawing Sheets

(56) References Cited

U.S. PATENT DOCUMENTS

| | | | |
|---|---|---|---|
| 2011/0296049 A1* | 12/2011 | Wang | H04N 21/437 709/231 |
| 2012/0159468 A1* | 6/2012 | Joshi | G06F 8/61 717/172 |
| 2012/0266156 A1* | 10/2012 | Spivak | G06F 9/5055 717/172 |
| 2013/0227224 A1* | 8/2013 | Koinuma | G06F 11/1048 711/152 |
| 2013/0282642 A1* | 10/2013 | Claux | G06N 5/02 706/47 |
| 2013/0305039 A1* | 11/2013 | Gauda | G06F 21/6218 713/153 |
| 2014/0109085 A1* | 4/2014 | Carrara | G06F 8/61 717/178 |
| 2014/0359576 A1* | 12/2014 | Rath | G06F 8/34 717/121 |
| 2014/0366162 A1* | 12/2014 | Carroll | G06F 9/52 726/31 |
| 2015/0207749 A1* | 7/2015 | Cao | G06F 16/24568 709/226 |
| 2015/0248280 A1* | 9/2015 | Pillay | G06F 8/60 717/106 |
| 2015/0379409 A1* | 12/2015 | Hu | G06N 5/022 706/55 |
| 2015/0381435 A1* | 12/2015 | Todd | H04L 67/10 709/223 |
| 2017/0048079 A1* | 2/2017 | Nethi | H04L 12/2836 |
| 2017/0161023 A1* | 6/2017 | Khazanchi | G06F 8/20 |
| 2017/0201569 A1* | 7/2017 | Fu | H04L 67/34 |
| 2018/0113791 A1* | 4/2018 | Fink | G06F 11/362 |
| 2018/0254998 A1* | 9/2018 | Cello | H04L 67/10 |
| 2018/0267785 A1* | 9/2018 | Holman | G06F 8/60 |
| 2018/0324204 A1* | 11/2018 | McClory | H04L 41/5041 |
| 2018/0336027 A1* | 11/2018 | Narayanan | G06F 8/61 |

\* cited by examiner

REPURPOSING SERVERLESS APPLICATION COPIES

TECHNICAL FIELD

The present invention relates generally to information processing systems, and more particularly to the maintenance of compute services in information processing systems.

BACKGROUND

Many organizations have turned to cloud computing for the delivery of computing services. Companies offering cloud computing services are referred to as cloud providers. Typically, organizations are then charged for such services based on usage. Some cloud-based compute services allow organizations to build and run applications without having to manage servers. These types of applications may be referred to as "serverless" or Function-as-a-Service ("FaaS") applications because the administration of compute resources such as server and operating system maintenance, scaling, and so forth is generally managed by the cloud provider. One example of a cloud compute service that supports serverless applications is Amazon Web Service (AWS) Lambda as provided by Amazon.

Conventional approaches to application maintenance such as backup, de-bugging, testing, development, and so forth are problematic with serverless applications. The reasons are because these applications are composed of many different parts and components and do not maintain application state information. Instead, state is kept in external persistent services such as databases and object stores.

Thus, when for example, a bug or other defect occurs, a user often troubleshoots the problem by reviewing message logs or may even attempt a debugging session on a production system. These practices can be error prone, laborious, and fraught with danger. For example, message logs may lack sufficient detail, may require an inordinate amount of time to parse, may be overwritten, and so forth. Debugging on the production system may result in the loss of transactions, a commingling of test data with production data, and so forth.

Therefore, there is a need for improved systems and techniques for the maintenance of serverless or FaaS applications.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
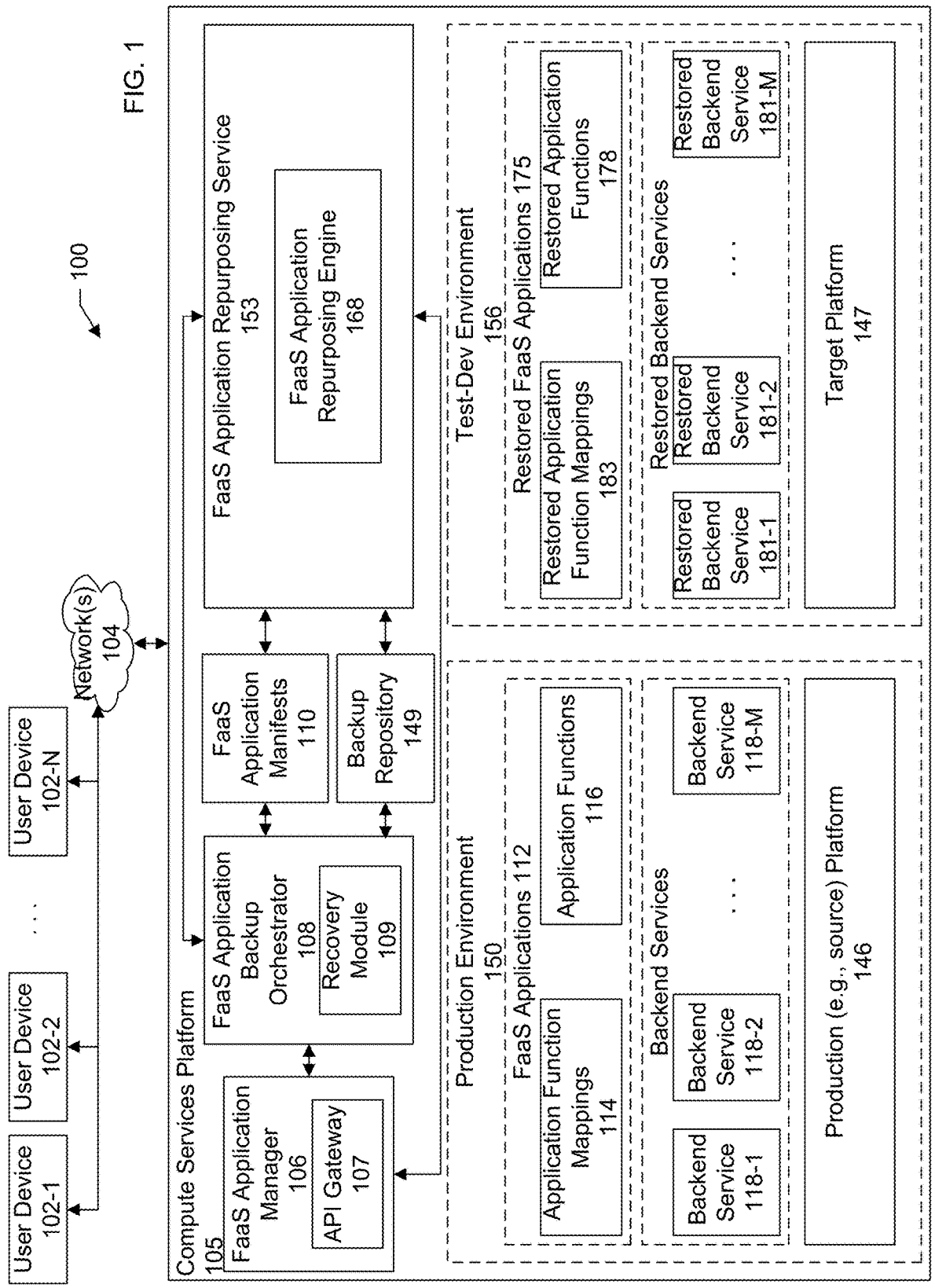
FIG. 1 shows a block diagram of an information processing system comprising a cloud-based compute services platform configured for automated capture, recovery, and repurposing of applications in a FaaS environment, according to one or more embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention. Aspects of the one or more embodiments described herein may be implemented on one or more computers executing software instructions, and the computers may be networked in a client-server arrangement or similar distributed computer network.

Disclosed herein are methods and systems to repurpose copies or backup copies of serverless applications in a Function-as-a-Service ("FaaS") environment for testing, debugging, development, analytics, or purposes other than recovering a production FaaS environment.

FIG. 1 shows an information processing system 100 configured in accordance with an illustrative embodiment. The information processing system includes user devices 102-1, 102-2, . . . 102-N. The user devices 102 communicate over a network 104 with a compute services platform 105.

The user devices can include, for example, desktop, laptop or tablet computers, mobile telephones, smartphones, portable communication devices, or other types of processing devices capable of communicating with the compute services platform 105 over the network 104. The variable N and other similar index variables herein such as M are assumed to be arbitrary positive integers greater than or equal to two.

The term "user" herein is intended to be broadly construed so as to encompass numerous arrangements of human, hardware, software or firmware entities, as well as combinations of such entities. Compute services are assumed to be provided for users under a Function-as-a-Service (FaaS) model, although it is to be appreciated that other types of cloud infrastructure arrangements could be used. For example, at least a portion of the available compute services in some embodiments may additionally or alternatively be provided under a Platform-as-a-Service (PaaS) model.

The compute services platform 105 in the present embodiment is therefore assumed to implement at least a portion of a FaaS environment accessible to the user devices 102 over the network 104.

The network 104 is assumed to comprise a portion of a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks. The network 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand, Gigabit Ethernet or Fibre Channel. Numerous alternative networking arrangements are possible in a given embodiment, as will be appreciated by those skilled in the art.

The compute services platform 105 implements compute services on behalf of respective cloud infrastructure tenants each corresponding to one or more users associated with respective ones of the user devices 102. By way of example, the compute services are assumed to include execution of one or more serverless applications on behalf of each of one or more users associated with respective user devices 102, although it should be understood that illustrative embodiments are not limited to serverless applications, but are more generally applicable to any applications that execute at least in part within a FaaS environment.

The compute services platform 105 in some embodiments may be implemented as part of cloud infrastructure in the form of a cloud-based system such as an Amazon Web Services (AWS) system. Other examples of cloud-based systems that can be used to provide at least portions of the compute services platform 105 and possibly other portions of system 100 include Google Cloud Platform (GCP) and Microsoft Azure.

As a more particular example, the compute services platform 105 in some embodiments may be configured to implement a serverless application architecture similar to the AWS Lambda serverless application architecture, as described in reference documents of Amazon Web Services, Inc. entitled "AWS Lambda: Developer Guide," 2017, and "AWS Serverless Multi-Tier Architectures, Using Amazon API Gateway and AWS Lambda," November 2015, both of which are incorporated by reference herein along with all other references cited.

These and other serverless application architectures referred to herein allow users to build and run applications without the need to provision, maintain or otherwise manage any servers. Although a given compute services platform implementing such an architecture may include servers, the applications are referred to as "serverless" in that the applications can be run and scaled without user reference to any particular server or servers and the user is therefore relieved of any server-related issues. The term "serverless" should therefore not be construed as indicating that a compute services platform or other processing platform that executes a given serverless application cannot include any servers. Advantages of serverless application architectures include scalability and reduced operational costs as well as finely-grained metering of compute services actually utilized by platform users.

Again, references herein to serverless applications are intended as examples of applications that may be executed in a FaaS environment. Other types of applications can be executed in a FaaS environment in other embodiments.

The compute services platform 105 in the embodiment of FIG. 1 illustratively comprises a FaaS application manager 106 having an application programming interface (API) gateway 107. The FaaS application manager 106 interacts with a FaaS application backup orchestrator 108 that includes a recovery module 109. The FaaS application backup orchestrator 108 utilizes FaaS application manifests 110 to control capture and recovery of corresponding FaaS applications 112 that may be executing on a production portion 146 of the compute services platform and located in a production FaaS environment 150. The FaaS applications 112 can comprise serverless applications or other types of applications that execute at least in part within a FaaS environment such as that provided by the compute services platform 105. The FaaS applications 112 are examples of what are more generally referred to herein as simply "applications."

In an embodiment, the compute services platform further includes a FaaS application repurposing service 153. The FaaS application repurposing service is responsible for retrieving a copy of a FaaS application backed up from the production FaaS environment and restoring the application to a target portion 147 of the compute services platform and located in a test-development FaaS environment 156, rather than the production environment. The test-development FaaS environment may be referred to as a sandbox.

As part of restoration procedure, the FaaS application repurposing service provisions or directs the provisioning of the test-development environment and changes, updates, modifies, or alters various settings, parameters, properties, and attributes of the restored copy of the application so that execution of the application in the test-development environment does not affect the production environment. The production version of the application and the corresponding restored version of the application may execute concurrently, simultaneously, or in parallel with each other in their respective environments. An application may execute in the production FaaS environment independently of a version of the application that has been restored to the test-development FaaS environment. The FaaS application repurposing service allows a FaaS application to be easily tested and debugged without affecting the production version of the application. As another example, an analytics application can be run against the restored application (including data restored from the backend services) without disturbing the production version of the application because the restored version of the application can be run in a different environment. The analytics application will not affect the performance of the production version of the application.

A serverless architecture refers to applications that are packaged as stateless ephemeral containers that respond to external events and interact with backend services. Serverless architectures are becoming extremely popular because they can reduce an organization's or enterprise's operational cost (e.g., pay only when executing) and can be easily scaled. One example of a cloud vendor host that offers a platform for such applications is Amazon via AWS Lambda.

Examples of other cloud vendors providing platforms for serverless applications and functions include Google and Microsoft.

Often when modern technologies emerge, concerns like maintainability are not taken into consideration, especially during early iterations, which create gaps and vulnerabilities that become major concerns for companies adopting the technology. In a specific embodiment, systems and techniques are provided for facilitating and supporting repurposing full serverless application copies for the purpose of testing, debugging and effectively maintaining these types of applications.

A serverless application includes three types of artifacts that are required for it to operate in production: (1) backend services, (2) application functions, and (3) application function mappings. Backend services refer to databases, object stores, persisted messaging services, or other type of service that can store long term state for the application. Examples of backend services include AWS S3, DynamoDB, Aurora, or an Oracle database, among others.

Application functions refer to a set of stateless functions packaged as containers that will be invoked according to the application's function mappings. The application functions can interact with the backend services to read and store state. An example of an application function includes a python script that reads a photo from S3 and creates a thumbnail for it.

Application function mappings specify the conditions under which the application functions are invoked. More particularly, a serverless application requires set of conditions that instruct the platform to activate the application functions. Examples include reactions to events or operations of backend services (e.g., object uploaded to an S3 bucket, object deleted from an S3 bucket, transaction committed on a relational database, message has been sent to a queue) or assigned uniform resource locator (URL) endpoint (e.g., when a post request arrives at my-app-dns/my-app-api/data). Conditions could be simple or include more complex filters. In addition, application functions can directly invoke other functions (downstream functions).

Since the application includes so many independent parts, when a developer wants to simulate such an environment using data from a production system, it is becoming increasingly difficult to create such an environment. Debugging a serverless application (or a function-as-a-service application) is a complex task. The application is built of functions which in many cases communicate with each other indirectly, by updating data at a database or an object store.

In order to recreate copies for developers to debug and create new features using relevant data, the organization has to recover the application functions, application function mappings, and backend services components that define a serverless application. The application function images have to match to the schema of the restored backend services and conditions should be restored to the same point in time so that the application will operate as it did at the time when the copy was taken. In addition, all application images must refer to the recovered backend service instances rather than the production ones. Since application code can invoke other functions programmatically it should be verified that the calls are made on the repurposed environment and not on the production system. When recreating an environment, the configuration itself should also be restored since some of the issues reproduced might be bugs in the configuration itself.

With traditional applications it was relatively easy to create test environments. Since there was usually one major database used, a copy can be created using the native database technology and a new instance of an application may be executed pointing it to the newly restored database.

In serverless platforms, however, due to the plethora of components and dependencies, organizations generally avoid creating copies and instead rely on log messages in production to deduce how the system behaves. Relying on log messages can be problematic because some events may not be logged, messages may lack detail, logs may be overwritten, and so forth. Some organizations may even perform risky debugging sessions on production systems. In these cases, the consequences of a mistake can be disastrous because the production environment contains the live data and applications used to run the organization and process business critical data.

As a result, customers suffer from lack of productivity when taking these modern architectures to production systems. Not being able to respond quickly to issues or demands regarding the application also reduces the quality of the service customers experience.

In a specific embodiment, systems and techniques are provided that allow full automation and management of serverless application copies. This results in a significant improvement in the ease of such application maintenance. The management of serverless application copies is facilitated through a "serverless application manifest" ("SAM"). A SAM may be referred to as a FaaS application manifest, application manifest, serverless application manifest, or simply as a manifest.

The manifest includes metadata of a serverless application deployment and is used both to deploy and to backup the serverless application. Specifically, in order to protect an application instance, a first step is defining what an application is in this context. In this specific embodiment, an application is a set of functions, backend service instances, and application function mappings that represent a solution for a business need (e.g., shopping cart application for an e-commerce website, bank mobile application (or app) for a bank, and so forth). The application may be defined by the organization and reflects the granularity of data protection that can be applied.

In this specific embodiment, the serverless application manifest includes (1) application function descriptors; (2) backend services descriptors; (3) application function mappings; and (4) version detail of the SAM. The application function descriptors specify container images and corresponding version detail (e.g., Docker image). A container image is a lightweight, stand-alone, executable package of a piece of software that includes code, runtime, system tools, system libraries, and settings so that it can be run on a particular machine. Containers are an abstraction at the application layer that packages code and dependencies together. Multiple containers can run on the same machine and share the OS kernel with other containers, each running as isolated processes in user space. An example of an operating-system-level virtualization platform is Docker as developed by Docker, Inc. The application function descriptors may further specify instructions for how to build/download a binary (e.g., Docker registry); and bindings including a definition for which backend services those functions need access to.

Backend services descriptors specify which backend services are required to run the application and include access information on how to access/provision backend services. Application function mappings specify conditions for when to execute the application functions; and endpoints mappings to application functions.

Once a SAM has been generated or is otherwise available for a serverless application, an orchestrator takes backups of all application components according to the SAM. Specifically, upon the intervals defined by the user and associated or matched to a specific application, a copy creator or backup orchestrator runs or directs the following actions: (1) Store a copy of the current binary of each application function image that is part of the SAM; (2) Execute backup for all backend services that are part of the SAM; (3) Store metadata for all application function mappings that are listed as part of the SAM; and (4) Create a metadata entry relating all the above copies to a single application backup.

In an embodiment, a serverless application repurpose service allows a copy of a serverless application that has been backed up from a production environment to be deployed into a testing or development environment. For example, once an organization has decided that they would like to create full serverless application copies in order to perform test-dev operations, this service:

(1) Allows the user to choose which copy to use from the list of copies;
(2) Generates commands for the target platform that:
(2a) Provisions backend services required by the application,
(2b) Restores each and every backend service data from the copy,
(2c) Redeploys application function images from the container images on the copy,
(2d) Updates the application function mappings according to the mapping in the copy updating it to point to the restored function locations, and
(2e) Filters the application containers environment variables to point at local application functions (further described below); and
(3) Executes the commands against the target platform.

In a specific embodiment, each backend service supports its own backend service copy mechanism for taking copies and restoring. In this specific embodiment, the serverless application repurpose service, in conjunction with a backup orchestrator, issues backup and restore commands to the various backend services as required. A backend service copy mechanism of a respective backend service performs the backup (or restore) of the backend service and associated stored data under the direction of the serverless application repurpose service.

As discussed above, another task of the application repurpose service includes filtering application containers environment variables. Application functions invoke other application functions using a discovery mechanism implemented through environment variables injection. However, since the environment the application functions are deployed when repurposing has changed, it is desirable to ensure that direct calls to other (downstream functions) will also operate locally on the restored environment and not on the production environment. Thus, in a specific embodiment, the repurposing service scans the environment variables and replaces the production function location with the newly restored one. All the information exists in the context of repurposing since the repurposing service process is the one deploying the repurposed application copies.

In an embodiment, the serverless (or FaaS) application repurposing service allows creating a logical unit of a serverless application that includes all the metadata required in order to support dynamic and on-demand creation of copies for test-dev purposes. Some benefits of the repurposing service include a reduction of operational costs for maintaining such environments and increased software quality. The repurposing service allows organizations to benefit from the advantages of the modern serverless architecture while not compromising on software maintainability and quality.

Referring now to FIG. 1, each of the FaaS applications 112 of the compute services platform 105 in the FIG. 1 embodiment includes one or more application function mappings 114 and one or more application functions 116. The application functions 116 interact with backend services 118-1, 118-2, . . . 118-M of the compute services platform 105. The FaaS applications 112 can in some cases be configured to implement a compute services solution for a particular business or other organization, such as a shopping cart application for an electronic commerce web site or a mobile banking application for a financial institution. A wide variety of different types of applications can be implemented in the compute services platform 105 in order to meet the particular needs of platform users.

It is assumed that the compute services platform 105 in the FIG. 1 embodiment and other processing platforms referred to herein are each implemented using a plurality of processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The FaaS application manager 106 of the compute services platform 105 is configured to receive a request to execute one of the FaaS applications 112 and to initiate execution of the FaaS application responsive to the request. The request initiating execution of the FaaS application is received in the API gateway 107 of the compute services platform 105 from one of the user devices 102 over network 104. The request to initiate execution of the FaaS application can also be triggered by particular events, such as the creation of an object in an object store bucket, an operation on a database, and many other different types of events. As noted above, the FaaS applications in some cases include serverless applications executed by the compute services platform 105 in accordance with a FaaS model.

A given one of the FaaS applications 112 executed in the compute services platform 105 under the control of the FaaS application manager 106 illustratively comprises one or more of the application function mappings 114, one or more of the application functions 116 and utilizes one or more of the backend services 118.

Accordingly, the FaaS application manager 106 utilizes one or more of the application function mappings 114 to invoke one or more of the application functions 116 with each such application function interacting with one or more of the backend services 118 in executing the FaaS application.

The application function mappings 114 each specify one or more conditions under which particular ones of the application functions 116 are invoked. For example, the conditions specified by the application function mappings 114 may comprise respective events each relating to one or more of the backend services 118.

These and other conditions instruct the compute services platform 105 to activate the corresponding instances of the application functions 116. Examples of conditions that may be part of one or more of the application function mappings 114 include an object being uploaded to an AWS S3 bucket, a transaction being committed on a relational database, and a message being sent to a queue.

Other example conditions relate to events associated with designated URL endpoints. For example, one possible condition can be an event defined as a POST request arriving at a URL endpoint denoted my-app-dns/my-app-api/data. These and other conditions of this type not only indicate when to execute the application functions, but also map particular endpoints to certain application functions.

The various conditions that may be specified by the application function mappings 114 can include simple conditions as well as more complex conditions each based on filtering of multiple simpler conditions.

The application functions 116 are each assumed to execute in one or more stateless ephemeral containers of the compute services platform 105. Such containers can include the above-noted Docker containers or other types of LXCs. The containers are illustratively configured to respond to external events and to interact with backend services 118. The application functions 116 more particularly comprise stateless functions packaged as containers that will be invoked according to the conditions specified in one or more of the application function mappings 114. The application functions 116 can interact with one or more of the backend services 118 to read and store data using those backend services. For example, a given one of the application functions 116 can comprise a Python script that reads an image from an AWS S3 object store and creates a thumbnail for it.

The backend services 118 illustratively comprise at least one of a database service, an object storage service and a message processing service, although a wide variety of additional or alternative services can be supported in the compute services platform 105. More particular examples of backend services 118 include AWS S3, GCP Cloud Storage, Microsoft Azure Blob Storage, DynamoDB, MongoDB, Amazon Aurora and Oracle database. Although the backend services 118 in the present embodiment are shown as part of the compute services platform 105, at least a subset of these backend services in other embodiments may be implemented on one or more other processing platforms that are accessible to the compute services platform 105 over one or more networks.

Figure 2:
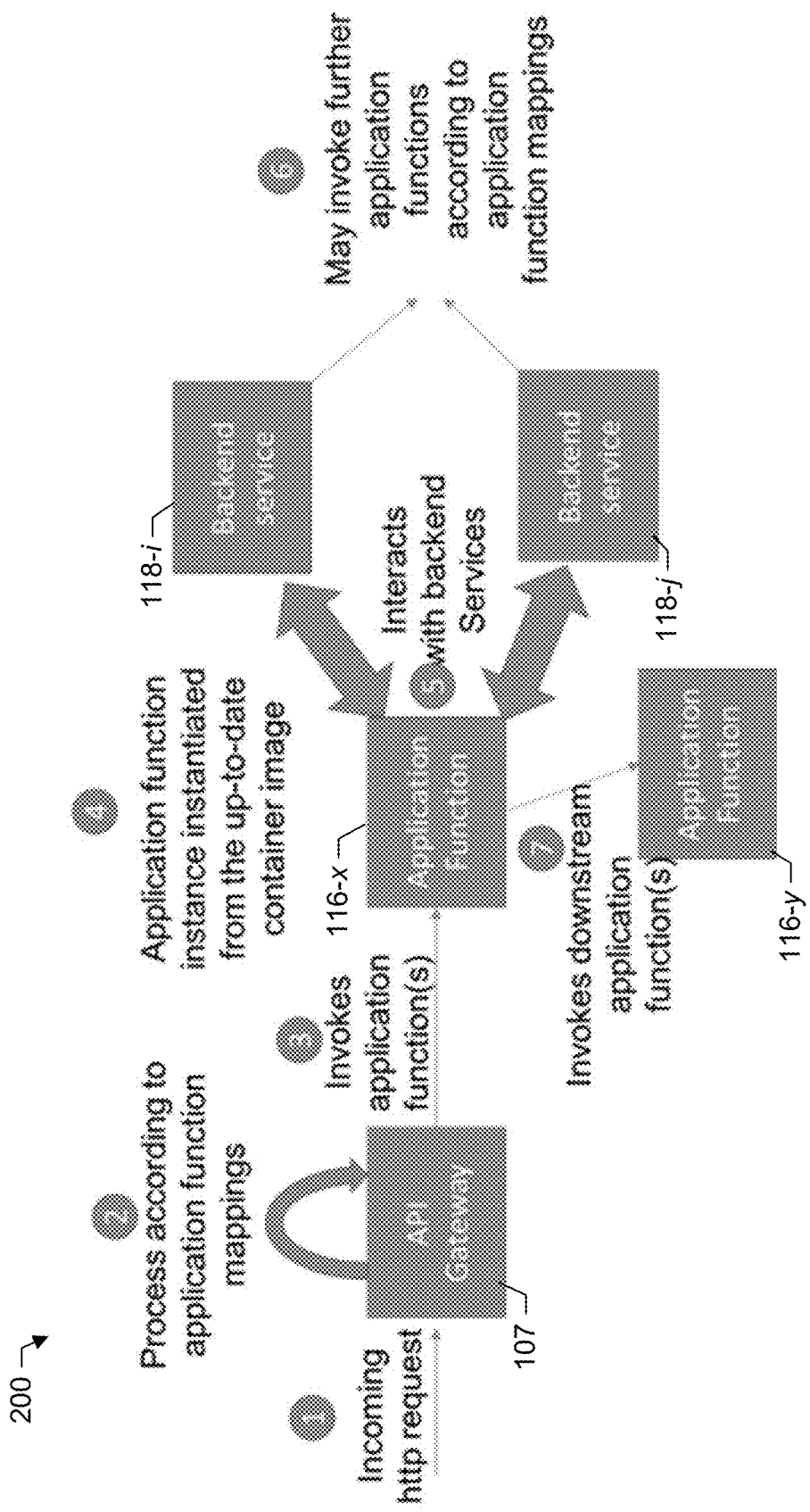
FIG. 2 shows a block diagram showing interactions between application function mappings, application functions, and backend services in a cloud-based compute services platform, according to one or more embodiments.

FIG. 2 illustrates example interactions 200 between particular ones of the application function mappings 114, application functions 116 and backend services 118 of compute services platform 105. These example interactions 200 are assumed to occur in conjunction with the execution of a given one of the FaaS applications 112 under the control of the FaaS application manager 106. The given FaaS application is also referred to in this context and other contexts herein as simply an "application."

The interactions 200 shown in FIG. 2 are arranged in multiple steps denoted as steps 1-7, and involve API gateway 107, a particular application function 116-$x$, another particular application function 116-$y$, and particular backend services 118-$i$ and 118-$j$.

In a step 1, an incoming request to initiate execution of the application is received in the API gateway 107 of the FaaS application manager 106. The request in this embodiment more particularly comprises a Hypertext Transfer Protocol ("HTTP") request received in the compute services platform 105 over the network 104 from one of the user devices 102.

In a step 2, the incoming request is processed by the FaaS application manager 106 using one or more of the application function mappings 114 that are determined to be associated with the request.

In a step 3, the API gateway 107 based on the processing in accordance with the one or more of the application function mappings 114 invokes one or more of the application functions 116. This illustratively includes at least application function 116-*x*, and may include additional application functions (e.g., application function 116-*y*).

In a step 4, an instance of the application function 116-*x* is instantiated by the FaaS application manager 106 using a corresponding up-to-date container image.

In a step 5, the instantiated application function 116-*x* interacts with multiple backend services including the backend services 118-*i* and 118-*j*.

In a step 6, each of the backend services 118-*i* and 118-*j* may invoke one or more additional ones of the application functions 116 in accordance with the particular application being executed.

In a step 7, an application function (e.g., application function 116-*x*) may invoke another or downstream application function (e.g., application function 116-*y*).

It is to be appreciated that these particular process steps, interactions and other features and functionality illustrated in the embodiment of FIG. 2 are presented by way of example only and can be varied in other embodiments.

Referring back now to FIG. 1, the FaaS application backup orchestrator 108 of the compute services platform 105 is configured to capture state of the application for a particular point in time. The state of the application for the particular point in time is captured in accordance with a corresponding one of the FaaS application manifests 110. The application manifest for a particular one of the applications can be generated prior to or in conjunction with execution of that application in the compute services platform 105.

For example, the application manifest may be a previously-generated application manifest that is generated by the FaaS application backup orchestrator 108 prior to the FaaS application manager 106 receiving a request to execute the application in the FaaS environment. As another example, the application manifest may be generated for the application responsive to receipt of an initial request to execute the application in the FaaS environment. Other techniques for generating application manifests prior to or in conjunction with execution of corresponding applications in the FaaS environment may be used.

In some embodiments, each of the FaaS applications 112 has a corresponding one of the FaaS application manifests 110 that directs the manner in which backups are to be generated for that application. Such application manifests are assumed to be automatically generated using techniques disclosed herein.

In executing a given application under the control of the FaaS application manager 106, multiple ones of the application functions 116 are invoked with each such application function interacting with one or more of the backend services 118. Invocation of one or more of the application functions 116 may occur under conditions specified by one or more of the application function mappings 114. For example, the conditions specified by the one or more application function mappings may comprise respective events each relating to one or more of the backend services 118.

The FaaS application backup orchestrator 108 automatically generates an application manifest characterizing relationships between the application functions and the backend services utilized in executing the application. It also implements other functionality relating to capture and recovery, possibly in cooperation with one or more other components of the compute services platform 105, such as capturing state of the application for a particular point in time based at least in part on the application manifest, and performing operational recovery of the application for the particular point in time utilizing the captured state.

In some embodiments, the application manifest comprises a graph having a plurality of nodes corresponding to respective ones of the application functions and the backend services, with edges between respective pairs of the nodes each indicating one of an invocation of a particular one of the backend services by a particular one of the application functions and an invocation of a particular one of the application functions by a particular one of the backend services. The graph may comprise a directed graph in which directed edges between respective pairs of nodes indicate respective directions of invocation between the corresponding application functions and backend services. Other types of directed or non-directed graphs may be used to provide at least a portion of an application manifest in these and other embodiments.

As noted above, the application manifest for a given one of the FaaS applications 112 in the FIG. 1 embodiment is automatically generated within the system 100. Automatically generating the application manifest may comprise automatically detecting the application functions and the backend services associated with the given application. For example, the FaaS application backup orchestrator 108 may generate at least one list-functions command directed to a particular service provider and for each resulting application function executing at least one get-function-configuration command to determine its associated backend services 118. The service provider may be associated with a particular processing platform that is part of the FaaS environment. A given instance of the get-function-configuration command illustratively provides access to function code and environmental variables for a corresponding one of the application functions 116.

The application manifest may additionally or alternatively comprises a listing of the application functions of the application and a listing of backend services that are invoked by or invoke each of the application functions.

The automatic generation of the application manifest for a particular application in some embodiments illustratively comprises determining function code and environmental variables for at least a subset of the application functions 116, and responsive to a determination that the function code and the environmental variables for a given one of the application functions invokes a given one of the backend services 118, creating an edge between one node of the graph corresponding to the given application function and another node of the graph corresponding to the given backend service.

As another example, automatically generating the application manifest may comprise determining one or more triggers for each of at least a subset of the application functions 116 and responsive to a determination that one of the triggers for a given one of the application functions comprises a given one of the backend services, creating an edge between one node of the graph corresponding to the given backend service and another node of the graph corresponding to the given application function.

These and other techniques may be used to configure the nodes and edges of the graph in embodiments in which the application manifest comprises such a graph.

The graph in the application manifest can then be used to capture state of the application for the particular point in time by, for example, determining at least one set of connected nodes for the application in the graph, generating a backup of the set of connected nodes, and generating backups for respective ones of any of the backend services having corresponding nodes in the set of connected nodes. The latter two steps can be iterated for each distinct set of connected nodes for the application in the graph.

It should be noted that the term "graph" as used herein is intended to be broadly construed, and does not require use of an explicit graphical visualization. For example, the term is intended to encompass stored data or other information characterizing nodes and edges that collectively define a graphical representation if so rendered.

A particular one of the FaaS application manifests 110 for use in capturing state of a given one of the FaaS applications 112 in the present embodiment may additionally or alternatively comprise the one or more application function mappings associated with that FaaS application, container image identifiers for respective ones of the application functions invoked by the one or more application function mappings, and descriptors for respective ones of the one or more backend services with which the invoked application functions interact in executing the application.

The container image identifiers can include information such as container binaries or code snaps as well as other types of information. Accordingly, the term "container image identifier" as used herein is intended to be broadly construed. Illustrative embodiments are therefore not limited to capturing state using container binaries and may additionally or alternatively utilize code snaps or other types of information characterizing one or more of the application functions in conjunction with capturing state.

The backend services descriptors in some case include access and provisioning information (e.g., how to access and/or provision backend services). It is to be appreciated, however, that different arrangements of metadata and other information can be included in an application manifest in other embodiments.

For example, the application manifest may additionally or alternatively comprise, for each of the one or more application functions of the application, a version indicator for the corresponding container image (e.g., Docker image), instructions for obtaining corresponding application function binaries or associated code, and one or more bindings of the application function to respective ones of the backend services with which the application function interacts. The instructions for obtaining corresponding application function binaries or associated code in such an arrangement illustratively comprise instructions for downloading one or more of the application function binaries or associated code from a container registry (e.g., Docker registry) or code hub. Other information that may be included in the application manifest includes a version indicator for that application manifest.

The application manifest therefore comprises metadata and other information relating to a particular application deployment and can be used both to deploy and to back up the application. The particular configuration of the application manifest can be specified by a developer or other user of the corresponding application. The application manifest advantageously serves to automate the backup orchestration of the corresponding application. It can in some cases be defined by a business organization to reflect the granularity of data protection to be applied.

A given one of the FaaS application manifests 110 may be automatically generated in conjunction with execution of its corresponding one of the FaaS applications 112 in the compute services platform 105.

For example, the given application manifest may be generated prior to an initial execution of the corresponding application in the compute services platform 105. In such an arrangement, initiating execution of the application responsive to a request may include initiating execution of the application based at least in part on the application manifest.

In capturing the state of the application for the particular point in time, the FaaS application backup orchestrator 108 is illustratively configured to store metadata for the one or more application function mappings that are part of the application manifest, to store a copy of a current binary or associated code for each application function container image identified in the application manifest, and to generate backups for each backend service having a descriptor in the application manifest. The FaaS application backup orchestrator 108 then generates additional metadata combining the metadata for the one or more application function mappings, the one or more stored copies of the current binaries or associated code, and the backups of the one or more backend services, into a corresponding application backup for the particular point in time.

It is therefore apparent that the FaaS application backup orchestrator 108 in this embodiment is responsible for capturing state of all components of a given application. The points in time at which backups of the application are taken can be in accordance with intervals specified by a corresponding user. For example, a user associated with a particular enterprise or other organization can take into account business continuity requirements in establishing appropriate points in time at which backups of the application will be taken. Such requirements can include service level agreements (SLAs) that may be in place with customers of the organization.

As another example, the FaaS application backup orchestrator 108 is illustratively configured to execute the following operations in capturing state of an application at a particular point in time:

1. Store a copy of the current binary of each application function container image that is part of the application manifest. Additionally or alternatively, corresponding code can be stored. References herein to storage of binaries or associated code should therefore be understood to encompass storage of binaries, code, or both. The code may more particularly comprise source code while the corresponding binaries may refer to such source code after compilation into machine language.

2. Execute backup for all backend services that are part of the application manifest.

3. Store metadata for all application function mappings that are part of the application manifest. Additional related information such as environmental variables is also stored.

4. Create a metadata entry relating all the above copies, backups and metadata to a single application backup.

The backup copies of an application as captured at various states may be stored in a backup repository 149. As discussed, an application may include application functions, backend services, and application function mappings as specified in a corresponding application manifest for the application. A backup copy of the application captured at a particular state likewise includes a copy of the application functions, backend services, and application function mappings captured at the particular state. These copies may be stored in the backup repository. Thus, a copy of an application stored in the backup repository may include both the stateless functions, data of the application that may be stored in a storage bucket, database, or both (e.g., copy of the storage bucket or copy of the database), mapping of the functions, location of function code, metadata, external services used by the application, or combinations of these. This application state capture process is just an example, and numerous alternative techniques can be used to capture state of an application in the FaaS application backup orchestrator 108.

The recovery module 109 of the FaaS application backup orchestrator 108 is configured in the present embodiment to perform operational recovery of an application for a particular point in time utilizing its state as captured in accordance with the corresponding application manifest.

For example, in some embodiments the recovery module 109 is configured to obtain the application backup for the particular point in time, to update the one or more application function mappings based at least in part on the stored metadata, to redeploy the application function container images from respective stored copies of their current binaries or associated code, and to recover the backend services from their respective backups.

The recovered application can then be executed under the control of one or both of the FaaS application manager 106 and the FaaS application backup orchestrator 108 using the updated one or more application function mappings, the redeployed application function container images and the recovered backend services.

As another example, the FaaS application backup orchestrator 108 is illustratively configured to execute the following operations in recovering the application using captured state for a particular point in time:

1. Allow the user to choose which of a plurality of backups of the application to use from a list of available backups.

2. Generate commands for a target portion of the compute services platform 105 that will:
   (i) update the application function mappings to the mappings that were in use when the selected backup was captured;
   (ii) redeploy application function container images from the selected backup; and
   (iii) recover all applicable backend services using the selected backup.

3. Execute the commands against the target portion of the compute services platform 105 in order to recover the application.

This application recovery process is just an example, and numerous alternative techniques can be used to recover a given application from captured state in the FaaS application backup orchestrator 108.

In illustrative embodiments, the FaaS application backup orchestrator 108 via its recovery module 109 is configured to recover a given application by recovering its corresponding instances of the application function mappings 114, application functions 116 and backend services 118 at a particular point in time. The recovered application is illustratively configured such that the application function images match corresponding schema of the restored backend services with which they interact and application function mapping conditions are also restored to the same point in time. The application comprising the various instances of application function mappings 114, application functions 116 and backend services 118 will therefore operate in exactly the same manner as it did at the point in time for which the backup was taken.

In some embodiments, the FaaS application backup orchestrator 108 is configured to capture state of application functions and backend services data of the application at each of a plurality of different points in time in accordance with the application manifest. The recovery module 109 can then permit user selection of at least one of a plurality of application backups characterizing the captured state for respective ones of the points in time, and to recover the application using the selected at least one of the application backups.

In an arrangement of this type, the user may be permitted to select a first one of the application backups for recovering the application functions and a second one of the application backups different than the first application backup for recovering the backend services data. Such an arrangement allows the application functions and the backend services data of the application to be separately recoverable from different ones of the application backups corresponding to respective different points in time as selected by the user.

It is also possible in recovering a given application to restore the application functions but not the backend services data, or to restore the backend services data but not the application functions. As noted above, the application functions and the backend services data can both be recovered, to the same or different points in time using the same or different backups of the application.

The FaaS application backup orchestrator 108 in some embodiments is implemented as part of an orchestration layer implemented in an otherwise conventional FaaS application architecture implemented in the compute services platform 105. Other system components such as the FaaS application manager 106 can interact with such an orchestration layer of the compute services platform 105.

In a specific embodiment, the recovery module operates under the direction of the FaaS application repurposing service to restore a copy of an application backed up from the production environment to the target platform located in the test-development environment-instead of the production environment. In a specific embodiment, the FaaS application repurposing service includes a FaaS application manifest repurposing engine 168. It should be appreciated that the components and modules shown in FIG. 1 may be functional and there can be many different hardware configurations.

The repurposing engine is responsible for provisioning or directing the provisioning of the test-development environment, instructing the recovery module to restore the application copy into the test-development environment, scanning the environment variables, changing, updating, or modifying the restored version of the application (and, in particular, the restored application function mappings of the restored application), and replacing any production environment variables associated with the restored application functions with the test-development environment variables.

Provisioning the test-development environment may include, for example, orchestrating the establishment of a network, load balancers, database layers, persistent storage, backend services, and so forth. Provisioning may include creating a logical storage unit (e.g., AWS S3 bucket), message queue, database, or namespace of database, and so forth in the test-development environment.

In a specific embodiment, a backup copy of an application that has been restored to the test-development environment is based on a FaaS application manifest used to make the backup copy of the production version of the FaaS application executing in the production environment. The restored version of the application may therefore specify, for example, the same backend services and application functions as specified in the manifest associated with the production version of the application. This helps to ensure that the same backend services and application functions used in the production environment are restored in the test-development environment.

For example, as shown in FIG. 1, the test-development environment includes a restored version of FaaS application 175 that includes one or more restored versions of the application functions 178 and restored versions of the backend services 181-1, 181-2, . . . 181-M. The restored application functions and restored backend services of a restored version of the application in the test-development environment may be the same application functions and backend services used in a production version of the application and which executes in the production environment.

In order to ensure that the restored version of the application does not, however, affect the production version of the application, restored versions of application function mappings 183 are changed, updated, or modified by the FaaS application repurposing engine. Thus, the restored application function mappings in the version of the application recovered into the test-development environment are different from the application function mappings in the production version of the application. This helps to ensure that the conditions or events under which the restored application functions are invoked for the restored application executing in the test-development environment do not result in invoking the application functions for the production version of the application executing in the production environment (and vice-versa).

Figure 3:
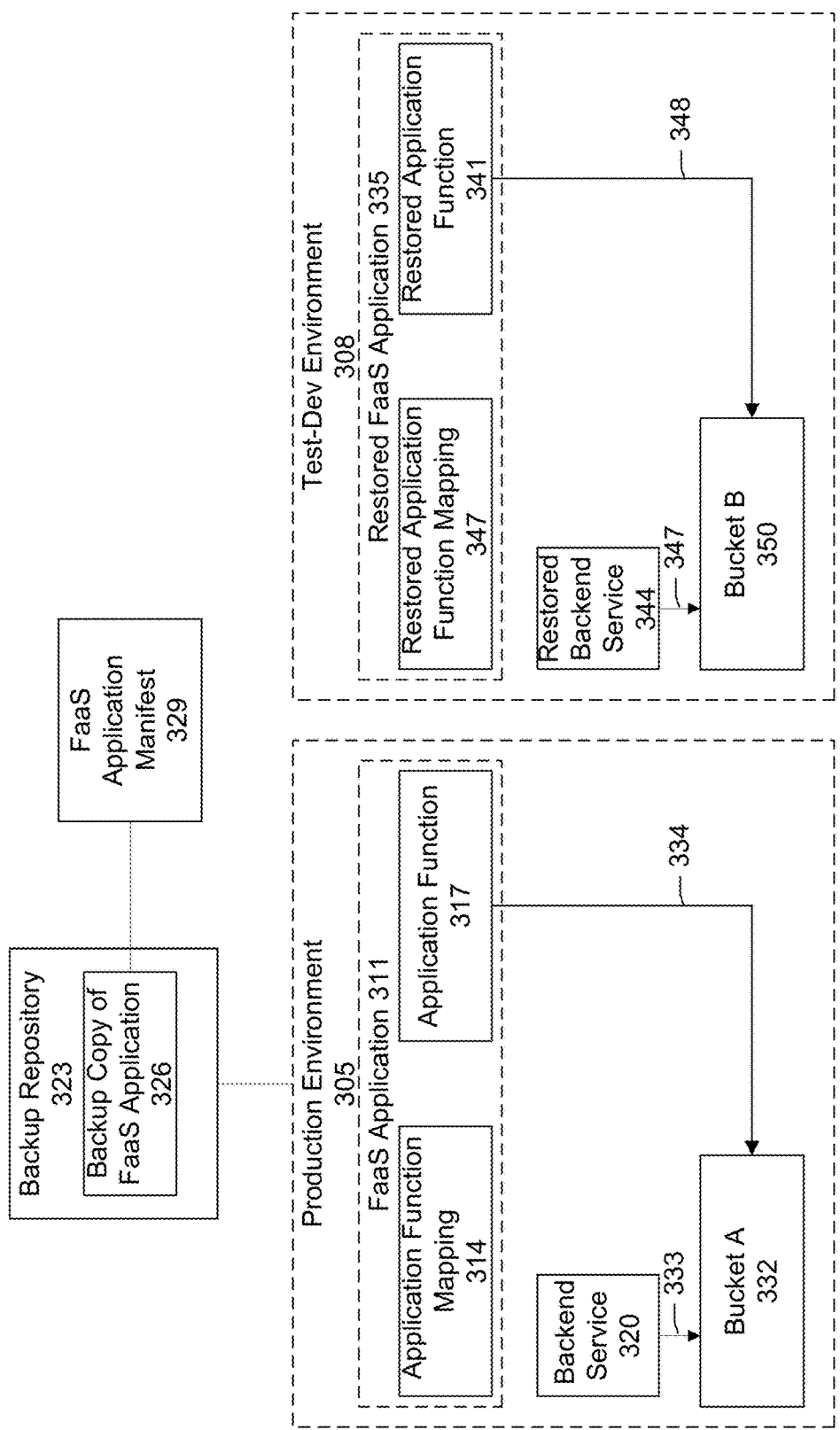
FIG. 3 shows a block diagram of a copy of an application backed up from a production FaaS environment being repurposed into a test-development environment, according to one or more embodiments.

For example, FIG. 3 shows a block diagram of a FaaS production environment 305 and a FaaS test-development environment 308. The production environment includes a FaaS application 311 that includes an application function mapping 314, application function 317, and backend service 320. A backup repository 323 stores a backup copy 326 of the application. The application copy is generated according to a FaaS application manifest 329 associated with the application. The application manifest for the application specifies the application function mapping, application function, and backend service.

Consider, as an example, that the backend service includes an object service that receives and uploads 333 a data unit (e.g., file) that is then stored as an object in a first bucket A 332 in an object store. The application function includes a script to read and process 334 the object once it has been uploaded to the bucket. For example, the object may be an image and the application function may create a thumbnail of the image. The application function mapping includes a condition that invokes the application function when the backend service has uploaded the object to the first bucket.

The FaaS test-development environment includes a restored version 335 of the application from the backup copy of the application. The application may be recovered according to its associated application manifest. Thus, the restored application may specify the same corresponding application function and backend service from manifest 329 so that these same components can be restored in the test-development environment. The test-development environment may include a restored application function 341 and restored backend service 344 that are the same as the corresponding respective application function and backend service from or backed up from the production environment. A restored application function mapping 347 for the restored application, however, will be changed, updated, modified, or altered to include conditions or triggers that are different from the application function mapping in the production version of the application.

For example, the restored application function mapping may be changed to include a condition that invokes the restored application function to read and process 348 the object when the restored backend service has uploaded 347 the object to a second bucket B 350, different from the first bucket. In other words, the function trigger has been changed from the first bucket A to the second bucket B. Thus, an object uploaded to the second bucket B by the restored version of the backend service will trigger the restored version of the application function in the test-development environment, but will not trigger the production version of the application function in the production environment, and vice-versa. That is, an object uploaded to first bucket A 332 by the production version of the backend service will trigger the production version of the application function, but will not trigger the restored version of the application function in the test-development environment.

Consider, as another example, that a manifest for an application specifies an application function mapping, an application function, and a backend service. The backend service includes a database service that writes a transaction to a first database (or first table of a database). The application function includes a script to read and process the transaction once it has been written to the first database. For example, the transaction may be a purchase order and the application function may forward the purchase order to a supplier for fulfillment. The application function mapping includes a condition that invokes the application function when the backend service has written to the first database.

A copy of the application recovered into the test-development environment according to the application manifest for the application may include the same corresponding application function and backend service as the production version of the application. The restored application function mapping, however, is changed so that it is different from the application function mapping in the production version of the application. Specifically, in this example, the restored application function mapping is changed to include a condition that invokes the restored application function when the restored backend service writes to a second database (or second table of the database), different from the first database.

In other words, the function trigger has been changed from the first database to the second database. Thus, a write to the second database by the restored version of the backend service will trigger the restored version of the application function in the test-development environment, but will not trigger the production version of the application function in the production environment, and vice-versa. That is, a write to the first database by the production version of the backend service will trigger the production version of the application function, but will not trigger the restored version of the application function in the test-development environment.

Consider, as another example, that a manifest for an application specifies an application function mapping, an application function, and a backend service. The backend service includes a messaging service that sends or places messages onto a first message queue. The application function includes a script to read and process a message once it has been placed onto the first message queue. The application function mapping includes a condition that invokes the application function when the backend service has placed a message onto the first message queue.

A copy of the application recovered into the test-development environment according to the application manifest for the application may include the same corresponding application function and backend service as the production version of the application. The restored application function mapping, however, is changed so that it is different from the application function mapping in the production version of the application. Specifically, in this example, the restored application function mapping is changed to include a condition that invokes the restored application function when the restored backend service places a message onto a second message queue, different from the first message queue.

In other words, the function trigger has been changed from the first message queue to the second message queue. Thus, an insertion of a message onto the second message queue by the restored version of the backend service will trigger the restored version of the application function in the test-development environment, but will not trigger the production version of the application function in the production environment, and vice-versa. That is, an insertion of a message onto the first message queue by the production version of the backend service will trigger the production version of the application function, but will not trigger the restored version of the application function in the test-development environment.

It should be appreciated that the backend service can be any generic service and not necessarily a database service, message queue service, or object storage service. Database, message queue, and object storage services are merely examples of different categories or types of backend services involving database, messaging, and storage components, respectively. Other types of backend services may involve or relate to compute, networking, analytics, application services, deployment, management, mobile services, developer tools, tools for the Internet of Things (IOT), migration, content delivery, management tools, security, identity, compliance, artificial intelligence, and so forth.

In an embodiment, an application function mapping of an application in a first FaaS environment includes a condition that specifies invoking an application function when a backend service performs an operation involving a component of a particular type, and the changing a condition includes: changing a condition in a restored version of the application function mapping to specify invoking a restored version of the application function when a restored version of the backend service performs the same operation, but involving a different component of the same particular type. For example, the component may be a database type component and the changing the condition may including specifying or identifying a different database from that as specified for the first FaaS environment. The component may be a storage type component and the changing the condition may include specifying a different storage bucket from that as specified for the first FaaS environment. The component may be a message queue type component and the changing the condition may include specifying a different message queue from that as specified for the first FaaS environment. And so forth.

Referring back now to FIG. 1, in an embodiment, the compute services platform 105 is assumed to comprise one or more storage systems configured to store FaaS application manifests 110, and other information relating to FaaS applications 112, restored FaaS applications 175, backend services 118, restored backend services 181, and other system functionality.

Such storage systems can comprise any of a variety of different types of storage including network-attached storage (NAS), storage area networks (SANs), direct-attached storage (DAS) and distributed DAS, as well as combinations of these and other storage types, including software-defined storage.

Other particular types of storage products that can be used in implementing a given storage system of compute services platform 105 in an illustrative embodiment include VNX® and Symmetrix VMAX® storage arrays, flash hybrid storage products such as Unity™, software-defined storage products such as ScaleIO™ and ViPR®, cloud storage products such as Elastic Cloud Storage (ECS), object-based storage products such as Atmos®, scale-out all-flash storage arrays such as XtremIO™, and scale-out NAS clusters comprising Isilon® platform nodes and associated accelerators, all from Dell EMC. Combinations of multiple ones of these and other storage products can also be used in implementing a given storage system in an illustrative embodiment.

The term "processing platform" as used herein is intended to be broadly construed so as to encompass, by way of illustration and without limitation, multiple sets of processing devices and one or more associated storage systems that are configured to communicate over one or more networks.

As a more particular example, the FaaS application manager 106, FaaS application backup orchestrator 108, or FaaS application repurposing service 153 can each be implemented in the form of one or more LXCs running on one or more VMs. Other arrangements of one or more processing devices of a processing platform can be used to implement the FaaS application manager 106, FaaS application backup orchestrator 108, and FaaS application repurposing service 153 as well as other components of the compute services platform 105. Other portions of the system 100 can similarly be implemented using one or more processing devices of at least one processing platform.

Distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for different portions of the compute services platform 105 to reside in different data centers. Numerous other distributed implementations of the compute services platform 105 are possible.

Accordingly, the FaaS application manager 106, the FaaS application backup orchestrator 108, the FaaS application repurposing service, or combinations of these, can each be implemented in a distributed manner so as to comprise a plurality of distributed components implemented on respective ones of the plurality of compute nodes of the compute services platform 105.

Although illustratively shown as being implemented within the compute services platform 105, components such as FaaS application manager 106, FaaS application backup orchestrator 108, and FaaS application repurposing service 153 in other embodiments can be implemented at least in part externally to the compute services platform 105. For example, such components can each be implemented at least in part within another system element or at least in part utilizing one or more stand-alone components coupled to the network 104.

It is to be appreciated that these and other features of illustrative embodiments are presented by way of example only, and should not be construed as limiting in any way.

Accordingly, different numbers, types and arrangements of system components such as FaaS application manager 106, FaaS application backup orchestrator 108, and FaaS application repurposing service 153 can be used in other embodiments.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

For example, as indicated previously, in some illustrative embodiments functionality for automated capture and recovery of application state information can be offered to cloud infrastructure customers or other users as part of a PaaS offering.

Figure 4:
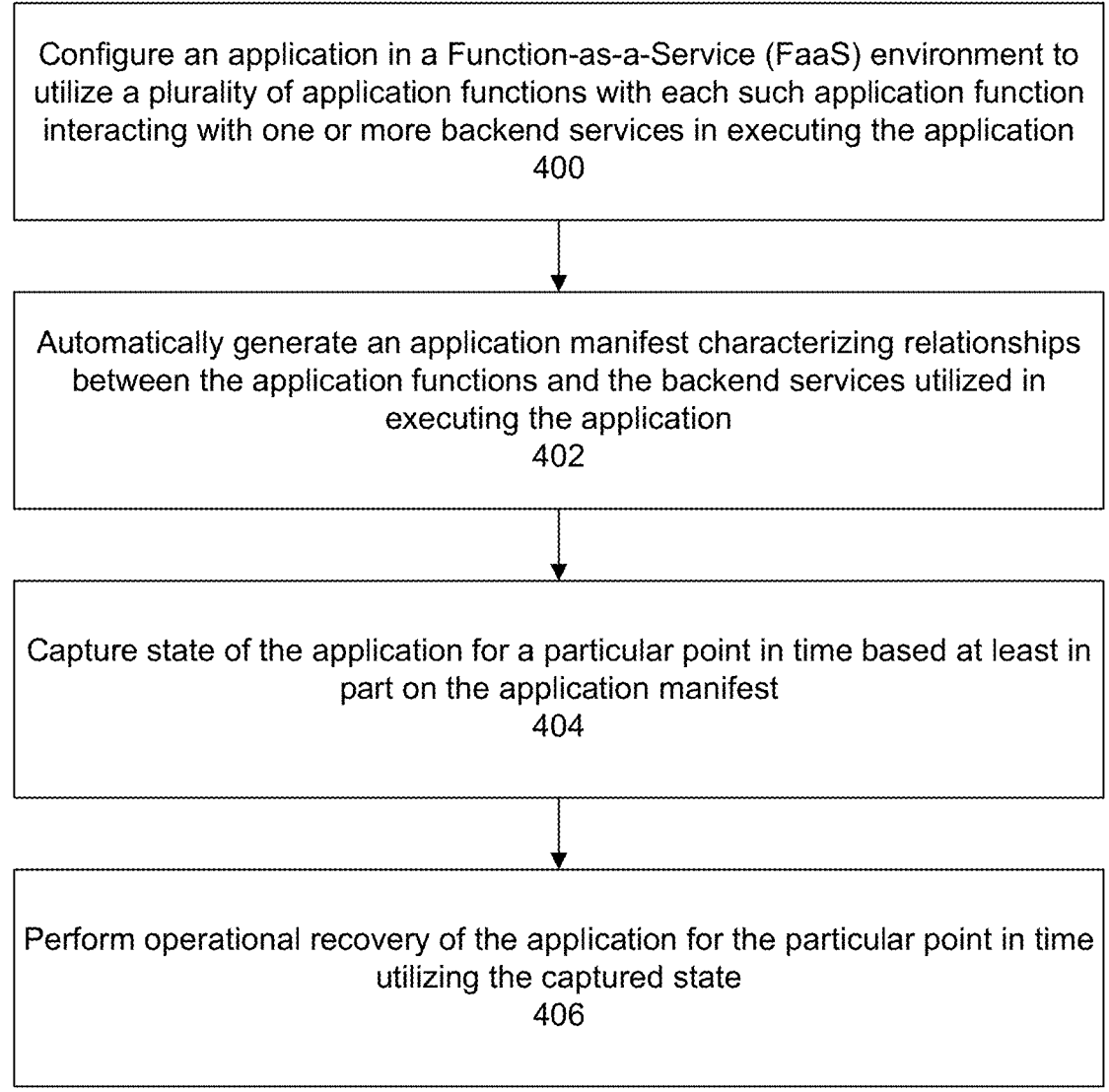
FIG. 4 shows a flow diagram of a process utilizing an application manifest for capture and recovery of an application in a FaaS environment, according to one or more embodiments.

FIG. 4 shows a flow of system 100 for making backup copies of a serverless application configured to execute in a FaaS environment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 400, an application in a FaaS environment is configured to utilize a plurality of application functions with each such application function interacting with one or more backend services in executing the application.

In a step 402, an application manifest is automatically generated, prior to or in conjunction with execution of the application in the FaaS environment. The application manifest characterizes relationships between the application functions and the backend services utilized in executing the application.

As described previously, the application manifest illustratively comprises a graph having a plurality of nodes corresponding to respective ones of the application functions and the backend services, with edges between respective pairs of the nodes each indicating one of an invocation of a particular one of the backend services by a particular one of the application functions and an invocation of a particular one of the application functions by a particular one of the backend services. A more detailed example of a graph of this type will be described below in conjunction with FIG. 7.

In a step 404, state of the application is captured for a particular point in time based at least in part on the application manifest. For example, capturing state of the application for a particular point in time based at least in part on the application manifest illustratively comprises determining at least one set of connected nodes for the application in the above-described graph, generating a backup of the set of connected nodes, and generating backups for respective ones of any of the backend services having corresponding nodes in the set of connected nodes.

In step 406, operational recovery of the application for the particular point in time is performed utilizing the captured state.

In some embodiments, the application manifest includes additional or alternative information, such as application function mappings, container image identifiers for respective ones of the application functions, and descriptors for respective ones of the backend services. Other types of additional or alternative information can be included in the application manifest in other embodiments.

Capturing the state of the application for the particular point in time may further comprise storing metadata for the one or more application function mappings that are part of the application manifest, storing a copy of a current binary or associated code for each application function container image identified in the application manifest, and generating backups for each backend service having a descriptor in the application manifest.

Additional metadata may be generated in order to combine the metadata for the one or more application function mappings, the one or more stored copies of the current binaries or associated code, and the backups of the one or more backend services, into an application backup for the particular point in time.

Performing operational recovery for the application in such embodiments may further comprise obtaining the application backup for the particular point in time, updating the one or more application function mappings based at least in part on the stored metadata, redeploying the application function container images from respective stored copies of their current binaries or associated code, and recovering the backend services from their respective backups. The recovered application is then executed utilizing the updated one or more application function mappings, the redeployed application function container images and the recovered backend services.

As mentioned previously, in some embodiments the state of application functions and backend services data of the application are captured at each of a plurality of different points in time in accordance with the application manifest. Users may then be permitted to select at least one of a plurality of application backups characterizing the captured state for respective ones of the points in time. The application is then recovered using the selected at least one of the application backups. Such an arrangement can allow the user to select a first one of the application backups for recovering the application functions and a second one of the application backups different than the first application backup for recovering the backend services data. The application functions and the backend services data of the FaaS application are thereby separately recoverable from different ones of the application backups corresponding to respective different points in time. Additional detail and functionality for capture and recovery of serverless applications that may be implemented in a cloud-based compute services platform such as compute services platform 105 (FIG. 1) can be found in U.S. patent application Ser. No. 15/666,793, filed Aug. 2, 2017 and entitled "Operational Recovery of Serverless Applications in a Cloud-Based Compute Services Platform," which is incorporated by reference herein.

Figure 5:
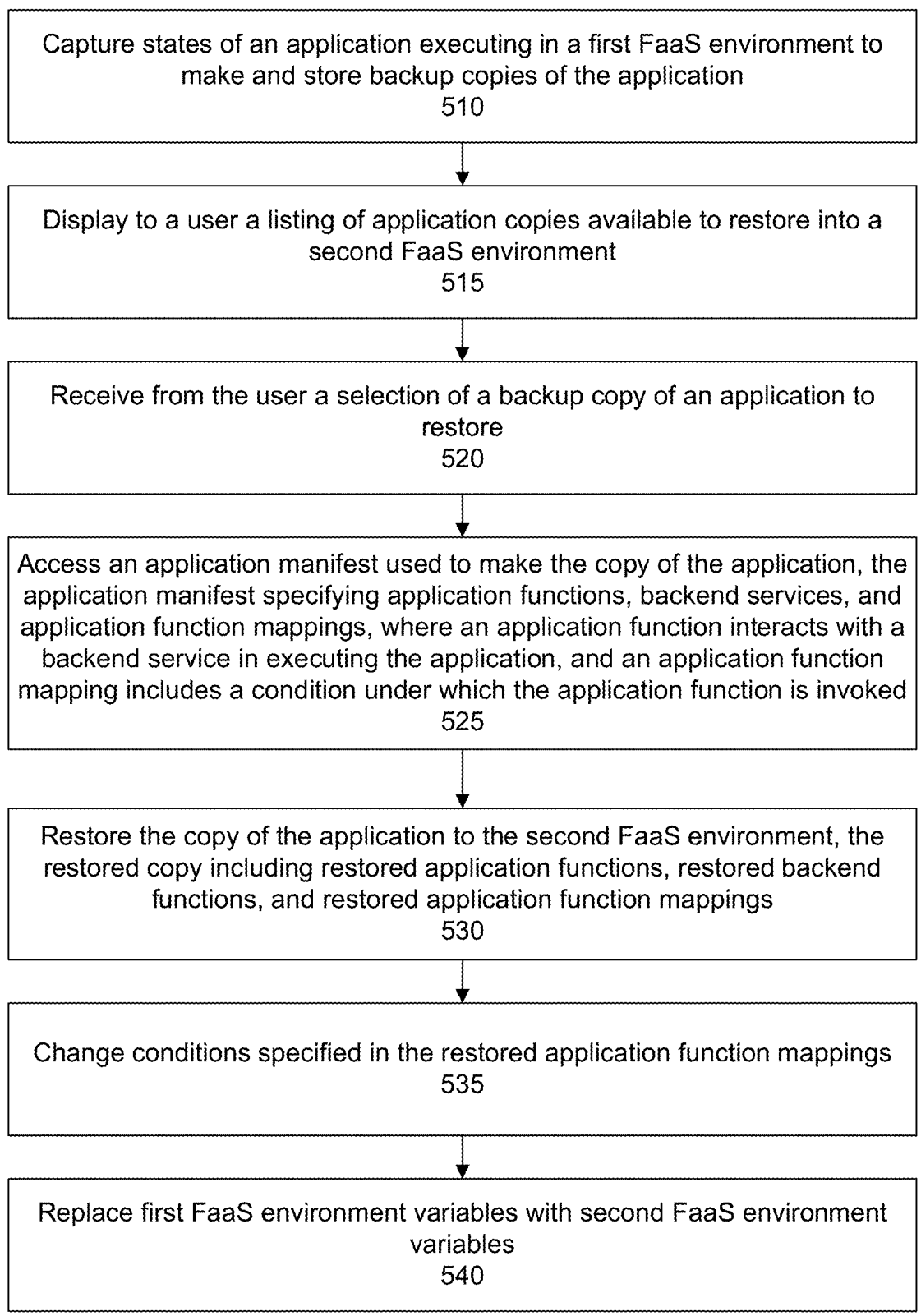
FIG. 5 shows a flow diagram of a process for recovering a copy of an application, backed up from a first FaaS environment, into a second FaaS environment, according to one or more embodiments.

FIG. 5 shows a flow of system 100 for repurposing a backup copy of a serverless application such as for testing or development purposes. In a step 510, various states of an application executing in a first FaaS environment (e.g., production environment) are captured and backup copies of the application are made and stored. Capturing application state may be performed as shown in steps 400-404 of FIG. 4. As discussed, a copy of an application may be generated based on an application manifest associated with the application.

In a step 515, a list of the application copies available for repurposing into the second FaaS environment is displayed to the user. For example, the repurposing service may include a graphical user interface (GUI) that is displayed on an electronic screen and that includes a listing of the application copies for the user to select. Instead or additionally, the repurposing service may include a programmatic interface (e.g., API) through which commands may be received indicating a particular application copy to repurpose.

In a step 520, the repurposing service receives from the user a selection of a copy of an application captured in the first FaaS environment for deployment into the second FaaS environment.

In a step 525, the repurposing service accesses the first application manifest used to capture the application in the first FaaS environment. The first application manifest may specify sets of one or more application functions, backend services, and application function mappings. In an embodiment, an application function interacts with a backend service in executing the application, and an application function mapping includes a condition under which the application function is invoked.

In a step 530, the selected copy of the application is restored to the second FaaS environment (e.g., restored onto a target platform within the second FaaS environment). The restored copy of the application thus includes restored versions of application functions, restored versions of backend services, and restored versions of application function mappings based on an application manifest used to make the copy of the application.

In a step 535, the repurposing service changes conditions specified in the restored application function mappings. As discussed, changing the conditions in the restored application function mappings helps to ensure that the restored application function is invoked when the restored backend service performs an operation, and that the application function (i.e., version of the application function in the first or production environment) is not invoked or prevented from being invoked, and vice-versa. Some examples of operations that backend services may perform include uploading or creating an object in a particular storage bucket (or other logical storage unit), writing to a particular database, or sending a message to a particular message queue.

There can be many ways in which the application function mappings may be changed. For example, in an embodiment, there can be a mapping changes file, separate from the manifest, that lists the details of the application function mappings to be changed. The mapping changes file may include, for example, an identification of a particular storage bucket from the first FaaS environment that is cross-referenced to an identification of a different particular storage bucket from the second FaaS environment; an identification of a particular database from the first FaaS environment that is cross-referenced to an identification of a different particular database from the second FaaS environment; an identification of a particular message queue from the first FaaS environment that is cross-referenced to an identification of a different particular message queue from the second FaaS environment; an identification of a particular assigned endpoint URL that is cross-referenced to an identification of a different particular assigned endpoint URL; or combinations of these.

The repurposing service can process the mapping changes file to find and replace a condition under which an application function is triggered with a different or new condition. For example, a previous condition may identify a first bucket and a new condition may identify a second bucket, different from the first bucket. A previous condition may identify a first database and a new condition may identify a second database, different from the first database. A previous condition may identify a first message queue and a new condition may identify a second message queue, different from the first message queue. A previous condition may identify a first URL and a new condition may identify a second URL, different from the first URL. A previous condition may identify a first address (e.g., address of a first database) and a new condition may identify a second address, different from the first address (e.g., address of a second database).

In a step 540, the repurposing service scans and replaces, for the restored copy of the application, first environment variables associated with the first FaaS environment with second environment variables associated with the second FaaS environment. For example, in an embodiment, an application function runs within a container. At runtime, environment variables are exposed to the application function inside the container. Environment variables may include configuration settings, encryption keys, external resource addresses, and so forth. Since an application function can call another application function (e.g., invoke a downstream application function), it is desirable to ensure that an application function restored to the second FaaS environment does not make a call to another application function that is in the first FaaS environment.

In a specific embodiment, there are first and second application functions. The first application function calls the second application function via an environment variable identifying a location of the second application function. The repurposing service replaces the environment variable with a new environment variable identifying a new location of the second application function. The new location may be in the second FaaS environment while the (previous) location may be in the first FaaS environment.

In an embodiment, a production version of an application executing in a production environment may include a set of first containers and a set of first application functions, where each first application function runs inside a respective first container. A test-development environment in which a test-dev version of the application has been deployed may include a set of second containers and a set of second application functions, where each second application function runs inside a respective second container. In other words, an application function may be wrapped in a container. The container may be monitored, cloned, and distributed on any number of servers such as by the cloud services provider.

The set of first application functions may be the same as the set of second application functions, respectively. For example, an application function of the first application function may include a Python script that reads a photo from an S3 storage bucket and creates a thumbnail of the photo. Similarly, a corresponding application function of the second application function may also include a Python script that reads a photo from an S3 storage bucket and creates a thumbnail of the photo.

Application function mappings associated with the set of first application functions, however, may be different from application function mappings associated with the set of second application functions. The number of first containers may be different from the number of second containers. A number of containers in the production environment running an application function of the first application function may be different from a number of containers running a corresponding application function of the second application function in the test-development environment. The number of containers in the production environment may be greater than the number of containers in the test-development environment because the production environment may generally experience higher load than the test-development environment. Alternatively, the number of containers in the test-development environment may be greater than the number of containers in the production environment, such as when the user wishes to test the scalability of the application in the test-development environment and see how the application responds to high loads and multiple concurrent requests.

In the context of the FIG. 1 embodiment, the FaaS application manager 106, the FaaS application backup orchestrator 108, the FaaS application repurposing service 153, or combinations of these are illustratively configured to control the performance of steps 400 through 406 of the FIG. 4 process, steps 510 through 540 of the FIG. 5 process, or both. Other system entities can additionally or alternatively be utilized to control or execute one or more of these steps.

It is to be appreciated that the FIGS. 4 and 5 processes and other application state capture and recovery features and functionality described above can be adapted for use with other types of information systems configured to execute applications on a compute services platform or other type of processing platform.

The particular processing operations and other system functionality described in conjunction with the flow diagram of FIGS. 4 and 5 are therefore presented by way of illustrative example only, and should not be construed as limiting the scope of the disclosure in any way. Alternative embodiments can use other types of processing operations involving execution of serverless applications or other types of applications in a FaaS environment. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different applications with respective operational recovery functionality within a FaaS environment of a given information processing system.

Functionality such as that described in conjunction with the flow diagram of FIGS. 4 and 5 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Additional illustrative embodiments incorporating functionality for capture and recovery of serverless applications and other types of applications in FaaS environments will now be described with reference to FIGS. 6 and 7.

Figure 6:
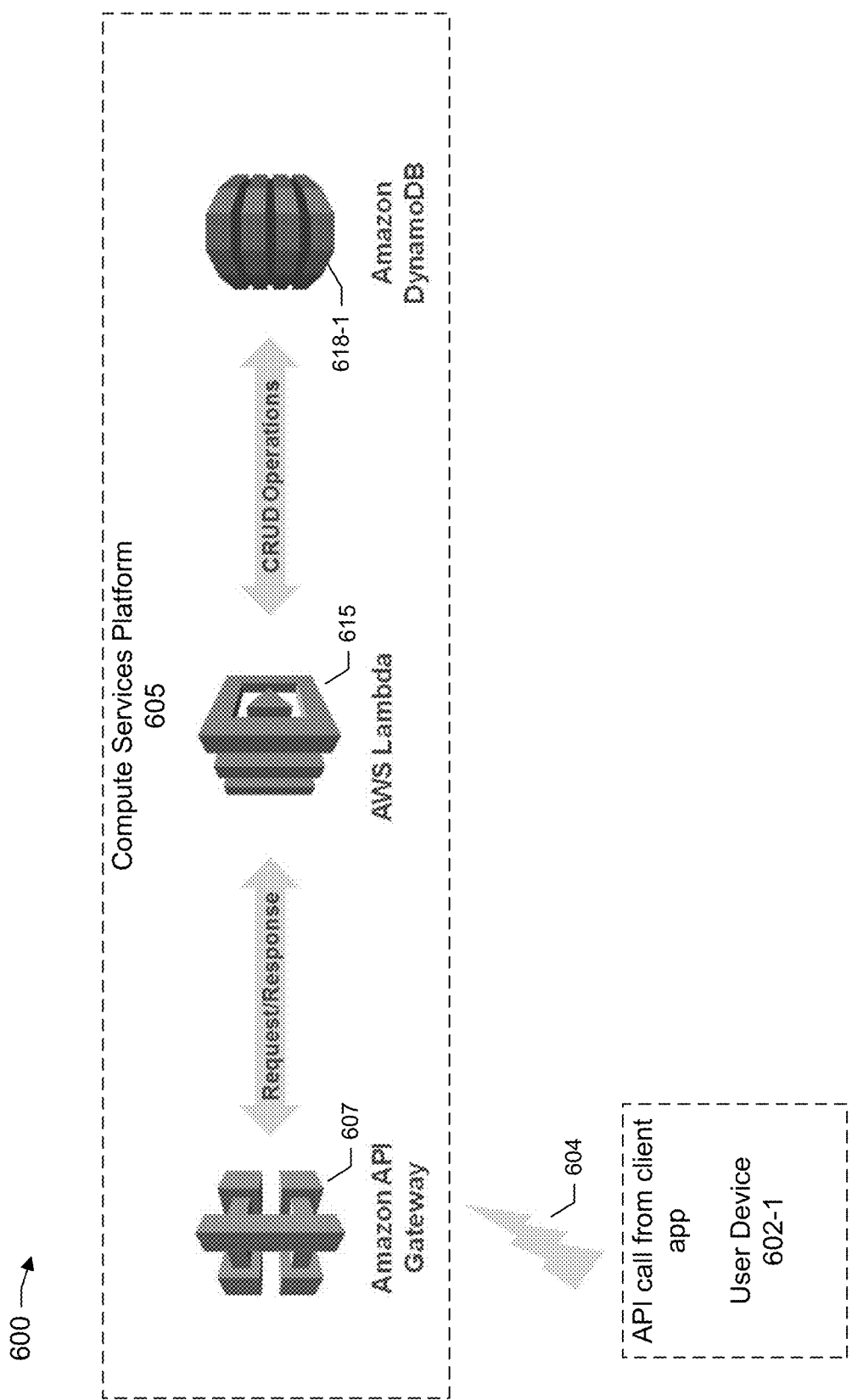
FIG. 6 shows another information processing system comprising a compute services platform providing a FaaS environment, according to one or more embodiments.

FIG. 6 shows another information processing system 600 comprising a compute services platform providing a FaaS environment. In the information processing system 600, a client application ("app") running on a user device 602-1 triggers execution of a FaaS application by generating one or more API calls 604 to a compute services platform 605. The compute services platform 605 illustratively comprises an API gateway 607 and an AWS Lambda system 615. The AWS Lambda system 615 is assumed to interact with a plurality of backend services including an Amazon Dynamo database 618-1 in executing the FaaS application in the FaaS environment.

The client application on the user device 602-1 generates a trigger in the form of an API call to a URL that identifies the API gateway 607. This trigger initiates execution of the FaaS application in the compute services platform 605, including at least one application function of the AWS Lambda system 605, such as storage of data in the database 618-1. Numerous additional or alternative application functions and associated backend services may be invoked in the course of execution of the FaaS application in the FaaS environment, although not explicitly illustrated in this simplified drawing.

The AWS Lambda system 615 in this embodiment is further assumed to implement conventional AWS Lambda functionality suitably modified to support automated capture and recovery for the FaaS application triggered by the client application running on the user device 602-1. The automated capture and recovery for the FaaS application in system 600 is based at least in part on automatically generating an application manifest for the FaaS application. The application manifest is assumed to comprise a graph characterizing relationships between the application functions and the backend services utilized in executing the FaaS application in the compute services platform 605. The application manifest is used to control capture and recovery in system 600 in substantially the same manner described previously in the context of system 100 of the FIG. 1 embodiment.

Likewise, in an embodiment, the AWS Lambda system 615 in this embodiment is further assumed to implement conventional AWS Lambda functionality suitably modified to support repurposing the captured FaaS application when triggered by the client application running on the user device 602-1. The repurposing of the FaaS application may include restoring the application to a test-dev environment based at least in part on the automatically generated application manifest used to backup the application from a production environment, changing or updating the restored application function mappings, and replacing application container environment variables specifying production function locations with application container environment variables specifying test-dev function locations.

Figure 7:
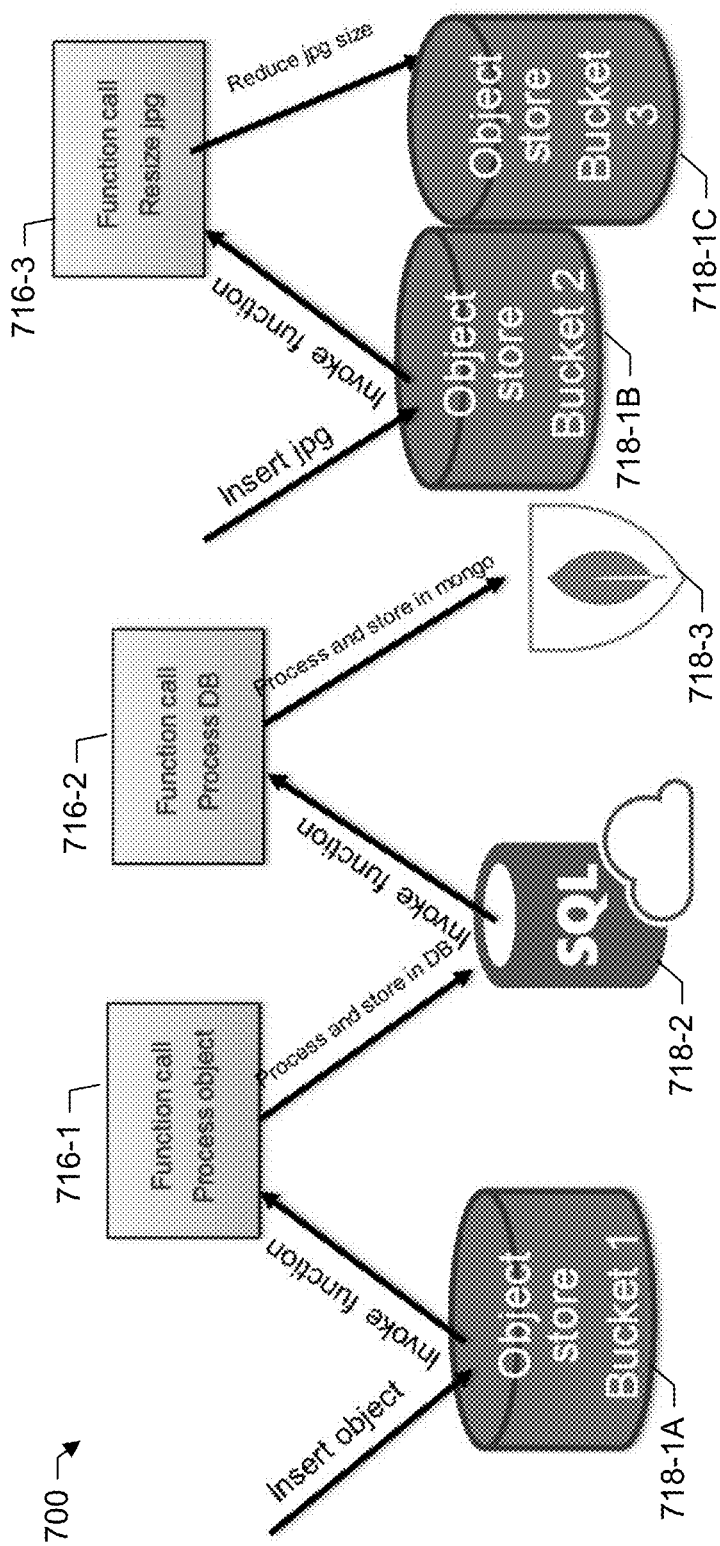
FIG. 7 shows an example of interactions between application functions and backend services for multiple distinct applications in a FaaS environment, according to one or more embodiments.

Another illustrative embodiment is shown in FIG. 7. In this embodiment, an information processing system 700 comprises a FaaS environment in which different application functions 716 interact with different backend services 718 in executing two distinct FaaS applications. The application functions in this embodiment more particularly include respective application functions 716-1, 716-2 and 716-3 for respective "Process Object," "Process DB" and "Resize JPG" functions, also denoted in the context of this example by corresponding "function calls."

The backend services 718 in this embodiment more particularly include three object store buckets 718-1A, 718-1B and 718-1C, also referred to as Object Store Bucket 1, Object Store Bucket 2 and Object Store Bucket 3, respectively, as well as SQL database 718-2 and MongoDB 718-3. The object store buckets are collectively referred to as object store 718-1. The system 700, like the system 600 previously described, is assumed to implement automated capture and recovery based at least in part on automatically-generated application manifests of the type previously described in conjunction with FIG. 1.

The first application executing in the FaaS environment of the system 700 has as its initial trigger the insertion of an object into the first object store bucket 718-1A. This in turn causes the first object store bucket 718-1A to invoke application function 716-1 to process the inserted object and store it in the SQL database 718-2. The SQL database 718-2 then invokes application function 716-2 to process and store at least portions of that database in MongoDB 718-3. The corresponding application manifest for the first application in this example comprises a graph including two nodes for respective ones of the application functions 716-1 and 716-2, three nodes for respective ones of the backend services 718-1A, 718-2 and 718-3, and a total of five edges given by the initial trigger and the four additional directed connections between the application functions and the backend services.

The second application executing in the FaaS environment of the system 700 has as its initial trigger the insertion of a JPEG image ("jpg") into the second object store bucket 718-1B. This in turn causes the second object store bucket 718-1B to invoke application function 716-3 to resize the inserted image and to store the resultant reduced-size image in the third object store bucket 718-1C. The corresponding application manifest for the second application in this example comprises a graph including one node for the application function 716-3, two nodes for respective ones of the object store buckets 718-1B and 718-1C, and a total of three edges given by the initial trigger and the two additional directed connections between the application function and the backend services.

The first and second applications are backed up in the system 700 utilizing their respective corresponding application manifests which comprise different graphs as described above. For example, capturing state of a given one of the applications for a particular point in time based at least in part on the application manifest may comprise determining the set of connected nodes for the application in the graph, generating a backup of the set of connected nodes, and generating backups for respective ones of any of the backend services having corresponding nodes in the set of connected nodes.

In backing up the first application, the set of connected nodes in the graph includes as backend services nodes the first object store bucket 718-1A as well as SQL database 718-2 and MongoDB 718-3. Each of these backend services may be backed up in the manner described elsewhere herein. Also, different techniques can be used to backup different ones of the backend services. For example, the object store 718-1 can be replicated using Amazon object replication to a different data zone, while the SQL database 718-2 and MongoDB 718-3 can use proprietary backups. Backups for one or more of the backup services can be created using respective corresponding Copy APIs if available. The backup of the first application additionally includes backups of the application functions and triggers as currently defined and reflected in the application manifest graph. The second application is assumed to be backed up in a similar manner, including backups of the backend services provided by object store buckets 718-1B and 718-1C.

In an embodiment, in repurposing the backup copy of the first application, the application manifest corresponding to the first application is used to restore application functions 716-1, 716-2, 716-3; backend services 718-1A, 718-2, and 718-3; and application function mappings associated with insertion of an object into the first object store bucket 718-1A; invocation of application function 716-1 to process the inserted object and store it in the SQL database 718-2; and invocation of application function 716-2 to process and store at least portions of that database in MongoDB 718-3. The application function mappings, however, will be changed or updated based on an object store bucket different from object store bucket 1 718-1A, a SQL database different from SQL database 718-2, and a MongoDB different from MongoDB 718-3.

With the changes to the application function mappings for the restored and repurposed version of the application, insertion of an object into the object store bucket different from object store bucket 1 718-1A will invoke the restored version of application function 716-1 and not invoke the production version of application function 716-1. The restored version of application function 716-1 processes the object inserted into the object store bucket different from object store bucket 1 718-1A and stores it in a SQL database different from SQL database 718-2. The different SQL database then invokes a restored version of application function 716-2 (and not the production version of application function 716-2) to process and store at least portions of that different database in a Mongo DB different from MongoDB 718-3. The backup copy of the second application may be repurposed in a manner similar to repurposing the backup copy of the first application.

The examples shown in FIG. 7 are simplified for purposes of illustration, but a given FaaS application could include many more application functions and associated backed services, with numerous associated invocations.

The application manifest can be periodically regenerated within the system 700 as additional application functions and associated backend services are added (or removed) to the corresponding application, so as to ensure that the appropriate backups are generated for a particular desired point in time.

Similarly, a new application manifest can be generated for the restored and repurposed version of the application that may be executing in the test-development environment. The new application manifest may be generated using a process similar to that shown in FIG. 4 and described in the discussion accompanying FIG. 4. The new application manifest may include the changed or updated application function mappings. The new application manifest helps to facilitate the backup and recovery of the test-development version of the application.

For example, in an embodiment, an application is associated with a first application manifest. A restored and repurposed version of the application is associated with a second application manifest. The first application manifest includes a first graph having a plurality of first nodes corresponding to respective ones of the application functions and the backend services. First edges between respective pairs of the first nodes each indicate one of an invocation of a particular one of the backend services by a particular one of the application functions or an invocation of a particular one of the application functions by a particular one of the backend services. The first edges can define application function first mappings.

The second application manifest includes a second graph having a plurality of second nodes corresponding to respective ones of restored versions of the application functions and restored versions of the backend services. Second edges between respective pairs of the second nodes each indicate one of an invocation of a particular one of the restored versions of the backend services by a particular one of the restored versions of the application functions or an invocation of a particular one of the restored versions of the application functions by a particular one of the restored versions of the backend services. The second edges can define application function second mappings. The application functions and backend services may be the same as the corresponding restored versions of the application functions and restored versions of the backend services, respectively. The application function first mappings, however, are different from the application function second mappings.

These and other embodiments automate the detection of application functions, backend services and other information that needs to be backed up to create a point in time copy of a given application executing in a FaaS environment, and also allow for a copy of the application to be repurposed without affecting the original application.

This information is gathered in an automated manner within the system. For example, a set of list-function commands, get-function-configuration commands or other types of commands may be issued to one or more service providers in order to obtain a list of functions and associated function configurations for a given application.

Illustrative embodiments of systems with automated capture and recovery of application state in a FaaS environment as disclosed herein can provide a number of significant advantages relative to conventional arrangements.

For example, some embodiments are configured to generate an application manifest that provides in a single logical unit all of the metadata and other information required to support operational recovery of a serverless application or other type of application executing in a FaaS environment. The application manifest may comprise an automatically-generated graph having nodes corresponding to respective ones of a plurality of application functions and a plurality of backend services, with edges between pairs of the nodes indicating invocation of a backend service by an application function or vice-versa.

These and other embodiments automate the backup orchestration of applications in a particularly efficient and effective manner, eliminating the need for error-prone manual administration of backups.

Such arrangements overcome the difficulties that would otherwise be associated with conventional backups of applications. For example, applications involving highly complex mappings of application functions to backend services can be handled accurately and without manual intervention. Furthermore, applications that are subject to ongoing modification through addition or deletion of application functions and associated backend services can be easily accommodated. As a result, organizations and other users can obtain the advantages of a FaaS application architecture without compromising service level agreements of their production applications.

These embodiments can provide consistent operational recovery even in situations in which application function mapping conditions of the application were changed or newer versions of application function container images were uploaded.

As indicated previously, illustrative embodiments utilize a graph to characterize relationships detected between application functions and backend services for a given application executing in a FaaS environment. Such embodiments also allow the information in the graph to be backed up in conjunction with backing up the application.

Some embodiments provide a generic solution that can be utilized with any type of application that may be executed in a FaaS environment, regardless of whether the FaaS environment is cloud-based or on-premises.

These and other embodiments can considerably facilitate data protection management in multi-cloud environments.

Figure 8:
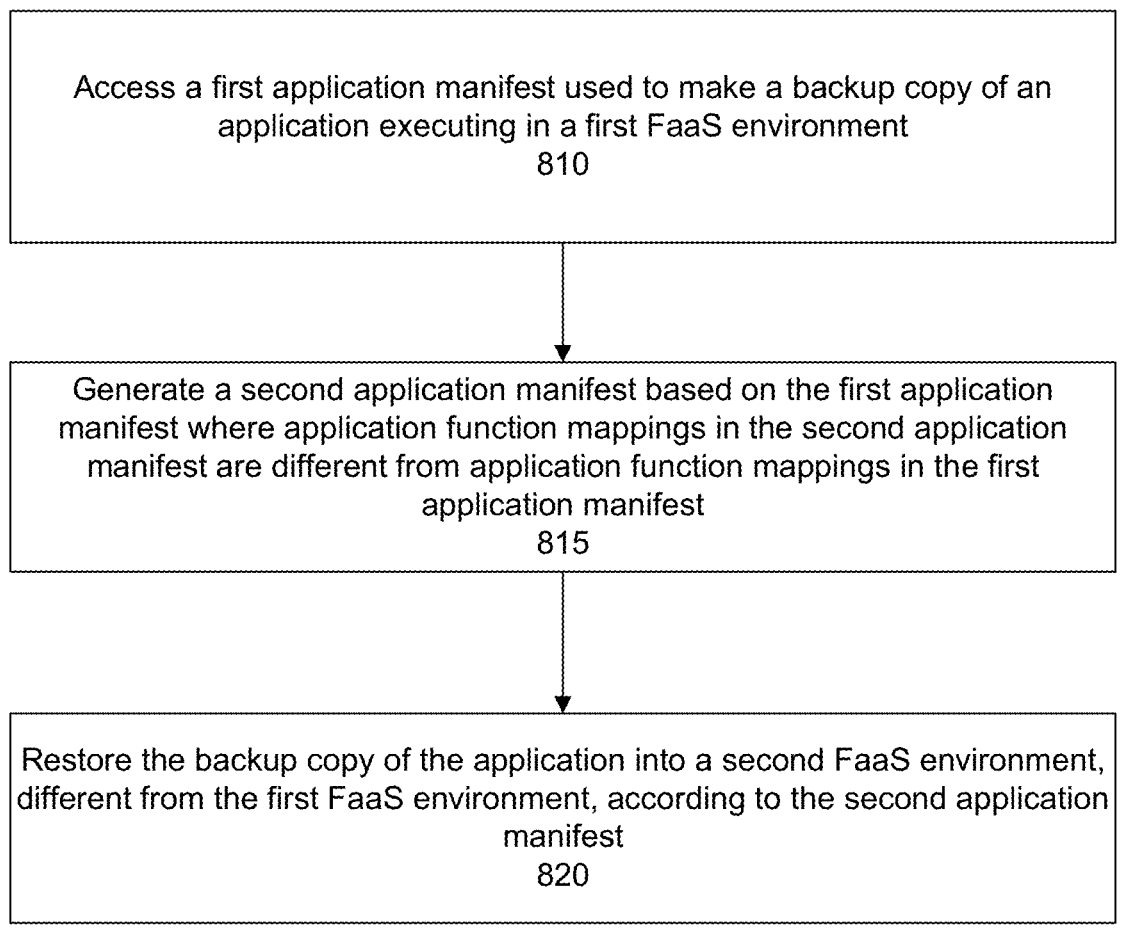
FIG. 8 shows another flow diagram of a process for recovering a copy of an application, according to one or more embodiments.

FIG. 8 shows another flow of a technique for repurposing a backup copy of an application. In this specific embodiment, an application backed up using a first application manifest is restored using a second application manifest where application function mappings in the second application manifest are different from application function mappings in the first application manifest. Specifically, in a step 810, the repurposing service accesses a first application manifest used to make a backup copy of an application executing in a first FaaS environment (e.g., production environment).

In a step 815, the repurposing service generates a second application manifest by changing the application function mappings from the first application manifest. The second application manifest may be generated by, for example, copying the first application manifest and changing, in the copy, the application function mappings, the changed copy of the first application manifest thereby being the second or repurposed manifest. The first application manifest remains unchanged so that it can be available to recover the application in the production environment should the need arise.

Changing the application function mappings may include reviewing an application function mapping to determine that a condition in the application function mapping specifies invoking an application function when an object is uploaded to a first bucket by a backend object service, and changing the condition to specify invoking the application function when an object is uploaded by the backend object service to a second bucket, different from the first bucket.

Changing the application function mappings may include reviewing an application function mapping to determine that a condition in the application function mapping specifies invoking an application function when a write is made to a first database by a backend database service, and changing the condition to specify invoking the application function when a write is made to a second database, different from the first database.

Changing the application function mappings may include reviewing an application function mapping to determine that a condition in the application function mapping specifies invoking an application function when a message is sent to a first message queue by a backend message service, and changing the condition to specify invoking the application function when a message is sent to a second message queue, different from the first message queue.

In a step 820, the backup copy of the application is restored to a second FaaS environment (e.g., test-development environment), different from the first FaaS environment, according to the second application manifest. Thus, in a specific embodiment, application function mappings may be changed or updated before a copy of an application backed up from a first (e.g., production) environment is restored onto a second (e.g., test-development) environment. In another specific embodiment, application function mappings may be changed after the copy of the application is restored on the test-development environment.

Providing for an application deployment according to a changed application manifest can help with updating and fixing an application. For example, a copy of the production version of the application may be repurposed onto a test-development environment for troubleshooting. Once the issues with the application in the test-development environment have been addressed and fixed, an application manifest for the fixed version of the application may be generated. A copy of the fixed version of the application may be made according to the application manifest. Prior to re-deploying the fixed version of the application back into production, the application manifest may be updated with production application function mappings and environment variables. The fixed version of the application may then be deployed back into production using the updated application manifest having the production application function mappings and environment variables.

In an embodiment, the system may maintain both the first FaaS application manifest that corresponds to the production version of the application and the second FaaS application manifest that corresponds to the test-development version of the application. This allows either version of the application to be easily backed up and recovered. Likewise, both application manifests may be periodically regenerated as additional application functions and associated backend services are added to the respective application versions, existing application functions and associated existing backend services are removed, or both.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As noted above, at least portions of the information processing system 100 may be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as the compute services platform 105 or portions thereof are illustratively implemented for use by tenants of such a multi-tenant environment.

As mentioned previously, cloud infrastructure as disclosed herein can include cloud-based systems such as AWS, GCP and Microsoft Azure. Virtual machines provided in such systems can be used to implement at least portions of one or more of a computer system and a content addressable storage system in illustrative embodiments. These and other cloud-based systems in illustrative embodiments can include object stores such as AWS S3, GCP Cloud Storage, and Microsoft Azure Blob Storage.

In some embodiments, the cloud infrastructure additionally or alternatively comprises a plurality of containers implemented using container host devices. For example, a given container of cloud infrastructure illustratively comprises a Docker container or other type of LXC. The containers may run on virtual machines in a multi-tenant environment, although other arrangements are possible. The containers may be utilized to implement a variety of different types of functionality within the system 100. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 9, 10, and 11. Although described in the context of system 100, these platforms may also be used to implement at least portions of other information processing systems in other embodiments.

Figure 9:
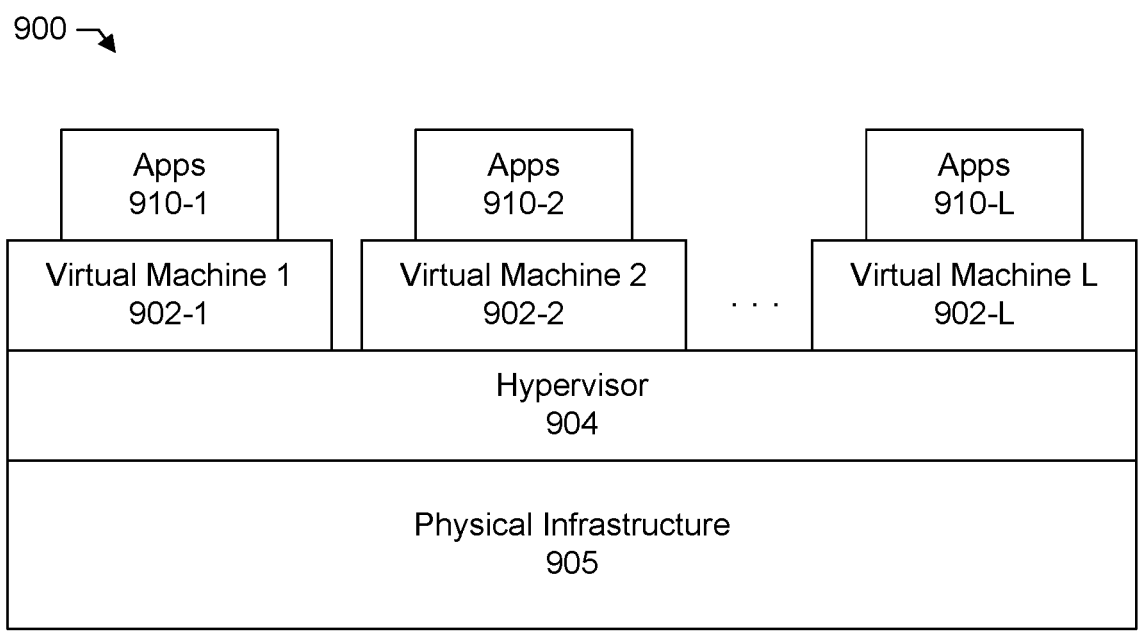
FIG. 9 shows a block diagram of a processing platform that may be utilized to implement at least a portion of an information processing system, according to one or more embodiments.
Figure 10:
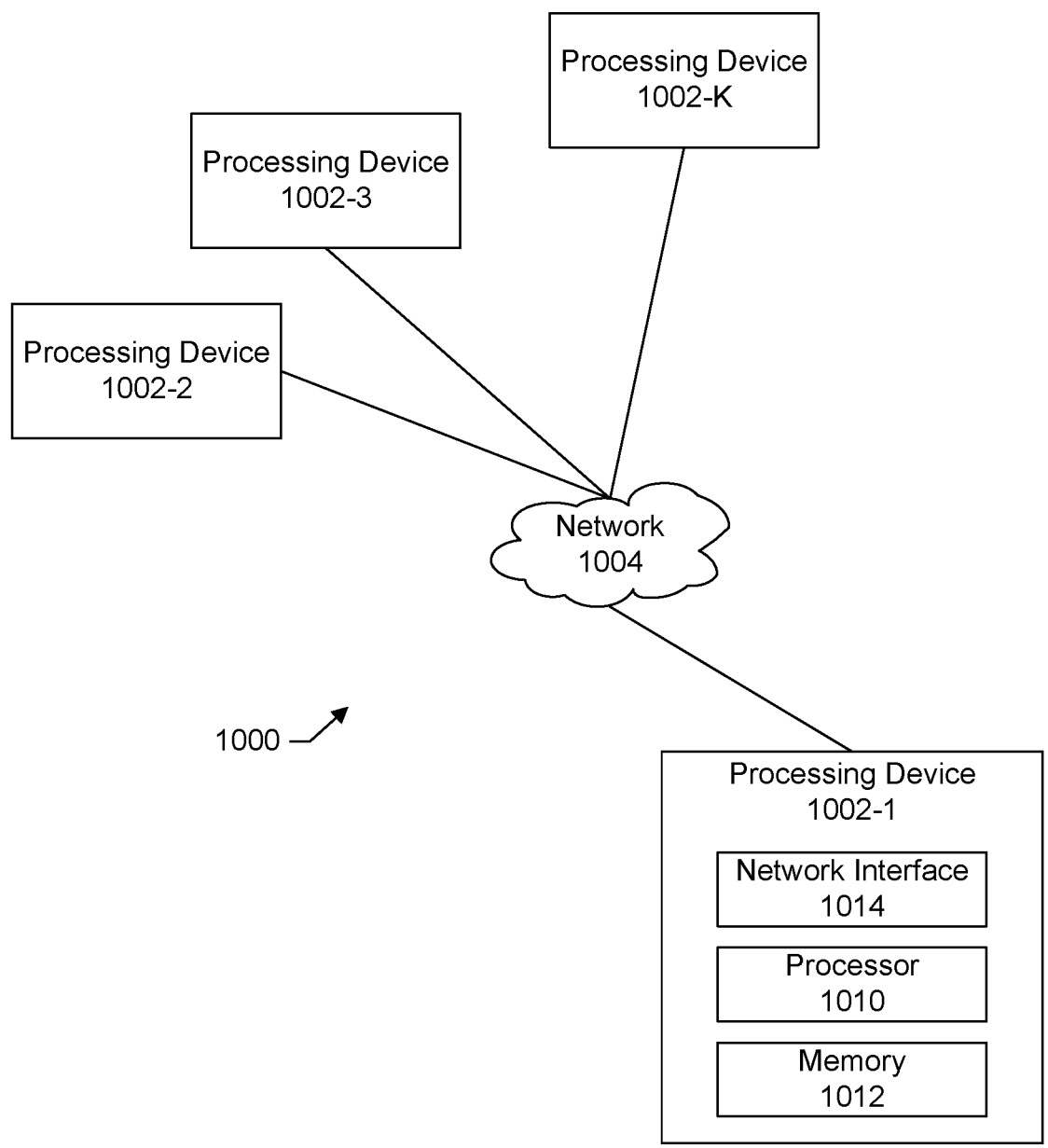
FIG. 10 shows another block diagram of a processing platform that may be utilized to implement at least a portion of an information processing system, according to one or more embodiments.

FIG. 9 shows an example processing platform comprising cloud infrastructure 900. The cloud infrastructure 900 comprises a combination of physical and virtual processing resources that may be utilized to implement at least a portion of the information processing system 100. The cloud infrastructure 900 comprises virtual machines (VMs) 902-1, 902-2, . . . 902-L implemented using a hypervisor 904. The hypervisor 904 runs on physical infrastructure 905. The cloud infrastructure 900 further comprises sets of applications 910-1, 910-2, . . . 910-L running on respective ones of the virtual machines 902-1, 902-2, . . . 902-L under the control of the hypervisor 904.

Although only a single hypervisor 904 is shown in the embodiment of FIG. 9, the system 100 may of course include multiple hypervisors each providing a set of virtual machines using at least one underlying physical machine. Different sets of virtual machines provided by one or more hypervisors may be utilized in configuring multiple instances of various components of the system 100.

An example of a commercially available hypervisor platform that may be used to implement hypervisor 904 and possibly other portions of the information processing system 100 in one or more embodiments is the VMware® vSphere® which may have an associated virtual infrastructure management system such as the VMware® vCenter®. The underlying physical machines may comprise one or more distributed processing platforms that include one or more storage systems.

As is apparent from the above, one or more of the processing modules or other components of system 100 may each run on a computer, server, storage device or other processing platform element. A given such element may be viewed as an example of what is more generally referred to herein as a "processing device." The cloud infrastructure 900 shown in FIG. 9 may represent at least a portion of one processing platform. Another example of such a processing platform is processing platform 1000 shown in FIG. 10.

The processing platform 1000 in this embodiment comprises a portion of system 100 and includes a plurality of processing devices, denoted 1002-1, 1002-2, 1002-3, . . . 1002-K, which communicate with one another over a network 1004.

The network 1004 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1002-1 in the processing platform 1000 comprises a processor 1010 coupled to a memory 1012.

The processor 1010 may comprise a microprocessor, a microcontroller, an application-specific integrated circuit (ASIC), a field-programmable gate array (FPGA) or other type of processing circuitry, as well as portions or combinations of such circuitry elements.

The memory 1012 may comprise random access memory (RAM), read-only memory (ROM) or other types of memory, in any combination. The memory 1012 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1002-1 is network interface circuitry 1014, which is used to interface the processing device with the network 1004 and other system components, and may comprise conventional transceivers.

The other processing devices 1002 of the processing platform 1000 are assumed to be configured in a manner similar to that shown for processing device 1002-1 in the figure.

Again, the particular processing platform 1000 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure such as VxRail™, VxRack™, VxRack™ FLEX, VxBlock™, or Vblock® converged infrastructure from VCE, the Virtual Computing Environment Company, now the Converged Platform and Solutions Division of Dell EMC.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of an information processing system as disclosed herein can be implemented at least in part in the form of one or more software programs stored in memory and executed by a processor of a processing device. For example, at least portions of the functionality of one or more components of the compute services platform 105 are illustratively implemented in the form of software running on one or more processing devices.

Figure 11:
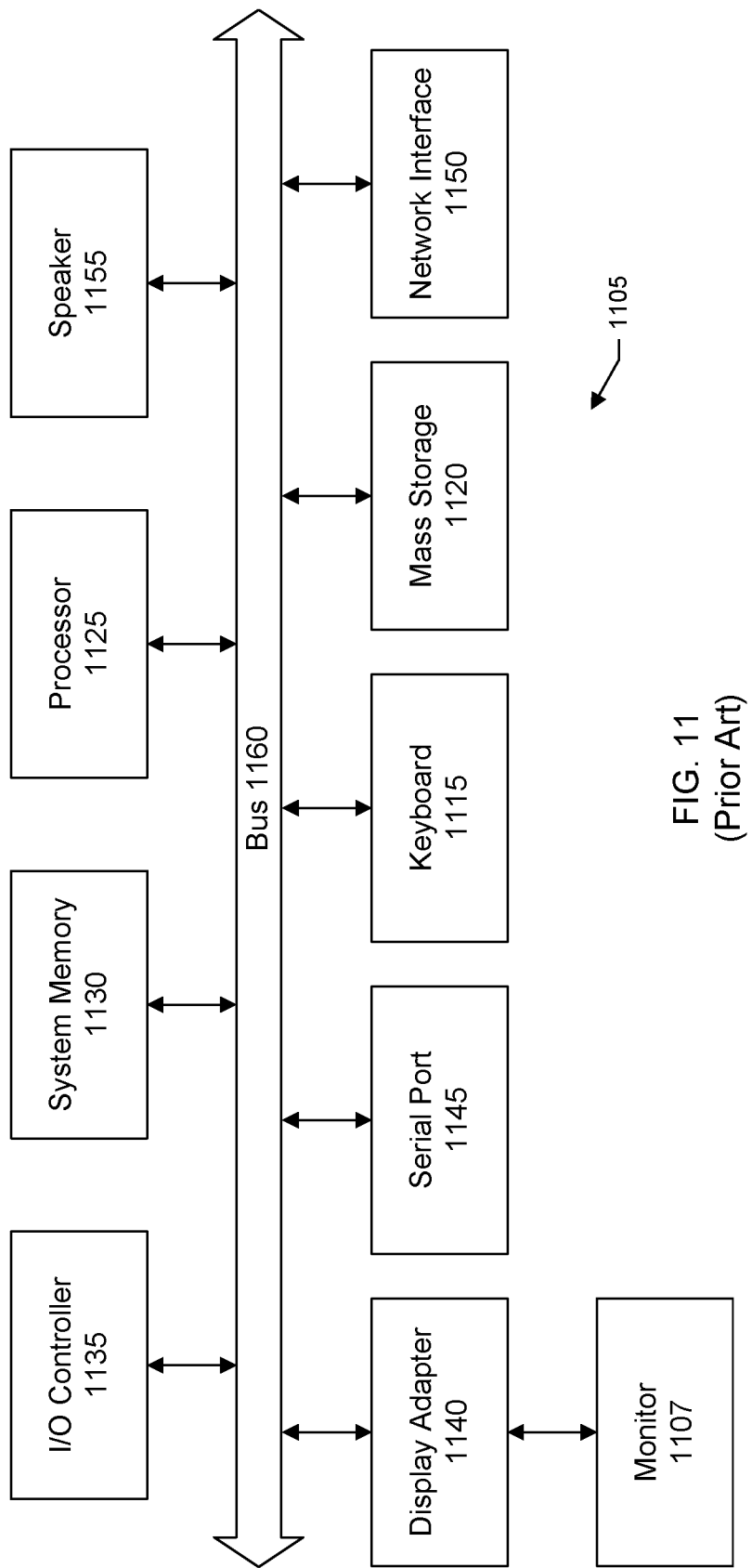
FIG. 11 shows a block diagram of a computer system suitable for use with the system, according to one or more embodiments.

FIG. 11 shows a system block diagram of a computer system 1105 used to execute the software of the present system described herein. The computer system includes a monitor 1107, keyboard 1115, and mass storage devices 1120. Computer system 1105 further includes subsystems such as central processor 1125, system memory 1130, input/output (I/O) controller 1135, display adapter 1140, serial or universal serial bus (USB) port 1145, network interface 1150, and speaker 1155. The system may also be used with computer systems with additional or fewer subsystems. For example, a computer system could include more than one processor 1125 (i.e., a multiprocessor system) or a system may include a cache memory.

Arrows such as 1160 represent the system bus architecture of computer system 1105. However, these arrows are illustrative of any interconnection scheme serving to link the subsystems. For example, speaker 1155 could be connected to the other subsystems through a port or have an internal direct connection to central processor 1125. The processor may include multiple processors or a multicore processor, which may permit parallel processing of information. Computer system 1105 shown in FIG. 11 is but an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software.

An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of a system of the invention using a wireless network using a protocol such as Wi-Fi (IEEE standards 802.11, 802.11a, 802.11b, 802.11e, 802.11g, 802.11i, 802.11n, 802.11ac, and 802.11ad, just to name a few examples), near field communication (NFC), radio-frequency identification (RFID), mobile or cellular wireless. For example, signals from a computer may be transferred, at least in part, wirelessly to components or other computers.

In a specific embodiment, there is a system comprising: a processor; and memory configured to store one or more sequences of instructions which, when executed by the processor, cause the processor to carry out the steps of: receiving a selection of a copy of an application backed up from a first function-as-a-service (FaaS) environment for deployment onto a target platform in a second FaaS environment, different from the first FaaS environment; accessing an application manifest of the application used to backup the application in the first FaaS environment, the application manifest specifying a plurality of application functions, backend services, and application function mappings, wherein an application function interacts with a backend service in executing the application, and an application function mapping comprises a condition under which the application function is invoked; restoring the copy of the application onto the target platform according to the application manifest, the restored copy of the application comprising a restored version of the application function, a restored version of the backend service, and a restored version of the application function mapping; and changing a condition specified in the restored version of the application function mapping, wherein based on the changed condition, the restored version of the application function is invoked when the restored version of the backend service performs an operation, and wherein the application function of the application in the first FaaS environment and corresponding to the restored version of the application function is not invoked.

In an embodiment, the application comprises a first application function that calls a second application function based on one or more environment variables exposed to the first and second application functions and associated with the first FaaS environment, and the processor further carries out the steps of: after the restoring the copy of the application onto the target platform, replacing one or more restored environment variables exposed to restored versions of the first and second application functions with corresponding one or more environment variables that are associated with the second FaaS environment.

In an embodiment, the application function runs inside a first container, the restored version of the application function runs inside a second container, and the processor further carries out the steps of: before runtime of the restored version of the application function, replacing a first plurality of environment variables that will be exposed to the restored version of the application function during the runtime with a second plurality of environment variables, wherein the first plurality of environment variables are associated with the first FaaS environment, and the second plurality of environment variables are associated with the second FaaS environment, and wherein each of the first and second plurality of environment variables comprise one or more of configuration settings, encryption keys, or external resource addresses.

In an embodiment, the application function mapping of the application in the first FaaS environment comprises a condition that specifies invoking the application function when the backend service performs an operation involving a component of a particular type, and the changing a condition comprises: changing a condition in the restored version of the application function mapping to specify invoking the restored version of the application function when the restored version of the backend service performs the same operation, but involving a different component of the same particular type.

In an embodiment, the application function mapping of the application in the first FaaS environment comprises a condition that specifies invoking the application function when the backend service uploads an object to a first storage bucket, and the changing a condition comprises: changing a condition in the restored version of the application function mapping to specify invoking the restored version of the application function when the restored version of the backend service uploads the object to a second storage bucket, different from the first storage bucket, and wherein the application function is not invoked when the restored version of the backend service uploads the object to the second storage bucket because of the changed condition.

In an embodiment, the application function mapping of the application in the first FaaS environment comprises a condition that specifies invoking the application function when the backend service writes to a first database, and the changing a condition comprises: changing a condition in the restored version of the application function mapping to specify invoking the restored version of the application function when the restored version of the backend service writes to a second database, different from the first database, and wherein the application function is not invoked when the restored version of the backend service writes to the second database because of the changed condition.

In an embodiment, the application function mapping of the application in the first FaaS environment comprises a condition that specifies invoking the application function when the backend service sends a message to a first message queue, and the changing a condition comprises: changing a condition in the restored version of the application function mapping to specify invoking the restored version of the application function when the restored version of the backend service sends the message to a second message queue, different from the first message queue, and wherein the application function is not invoked when the restored version of the backend service sends the message to the second message queue because of the changed condition.

In an embodiment, the application manifest is a first application manifest and comprises a first graph having a plurality of first nodes corresponding to respective ones of the application functions and the backend services, wherein first edges between respective pairs of the first nodes each indicate one of an invocation of a particular one of the backend services by a particular one of the application functions or an invocation of a particular one of the application functions by a particular one of the backend services, the first edges defining application function first mappings, and the processor further carries out the steps of: after the restoring the copy of the application onto the target platform, generating a second application manifest for the restored copy of the application, wherein the second application manifest comprises a second graph having a plurality of second nodes corresponding to respective ones of restored versions of the application functions and restored versions of the backend services, wherein second edges between respective pairs of the second nodes each indicate one of an invocation of a particular one of the restored versions of the backend services by a particular one of the restored versions of the application functions or an invocation of a particular one of the restored versions of the application functions by a particular one of the restored versions of the backend services, the second edges defining application function second mappings, wherein the application functions and backend services are the same as the corresponding restored versions of the application functions and restored versions of the backend services, respectively, and wherein the application function first mappings are different from the application function second mappings.

In another specific embodiment, a method includes: receiving a selection of a copy of an application backed up from a first function-as-a-service (FaaS) environment for deployment onto a target platform in a second FaaS environment, different from the first FaaS environment; accessing an application manifest of the application used to backup the application in the first FaaS environment, the application manifest specifying a plurality of application functions, backend services, and application function mappings, wherein an application function interacts with a backend service in executing the application, and an application function mapping comprises a condition under which the application function is invoked; restoring the copy of the application onto the target platform according to the application manifest, the restored copy of the application comprising a restored version of the application function, a restored version of the backend service, and a restored version of the application function mapping; and changing a condition specified in the restored version of the application function mapping, wherein based on the changed condition, the restored version of the application function is invoked when the restored version of the backend service performs an operation, and wherein the application function of the application in the first FaaS environment and corresponding to the restored version of the application function is not invoked.

In another specific embodiment, there is a computer program product, comprising a non-transitory computer-readable medium having a computer-readable program code embodied therein, the computer-readable program code adapted to be executed by one or more processors to implement a method comprising: receiving a selection of a copy of an application backed up from a first function-as-a-service (FaaS) environment for deployment onto a target platform in a second FaaS environment, different from the first FaaS environment; accessing an application manifest of the application used to backup the application in the first FaaS environment, the application manifest specifying a plurality of application functions, backend services, and application function mappings, wherein an application function interacts with a backend service in executing the application, and an application function mapping comprises a condition under which the application function is invoked; restoring the copy of the application onto the target platform according to the application manifest, the restored copy of the application comprising a restored version of the application function, a restored version of the backend service, and a restored version of the application function mapping; and changing a condition specified in the restored version of the application function mapping, wherein based on the changed condition, the restored version of the application function is invoked when the restored version of the backend service performs an operation, and wherein the application function of the application in the first FaaS environment and corresponding to the restored version of the application function is not invoked.

It should again be emphasized that the above-described embodiments are presented for purposes of illustration only. Many variations and other alternative embodiments may be used. For example, the disclosed techniques are applicable to a wide variety of other types of information processing systems, compute services platforms, FaaS applications, FaaS application managers, orchestrators and manifests, application function mappings, application functions and backend services. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment. Other embodiments include systems and non-volatile media products that execute, embody or store processes that implement the methods described above.

What is claimed is:

1. A system comprising: a processor; and memory configured to store one or more sequences of instructions which, when executed by the processor, cause the processor to carry out the steps of:
    reviewing an application manifest associated with a serverless application to create a backup copy of the serverless application, the serverless application executing in a first function-as-a-service (FaaS) environment on a compute services platform that is provided by a cloud vendor and comprising a plurality of stateless functions, packaged as containers, that interact with backend services and are invoked according to application function mappings, wherein data including state of the serverless application is stored external to the serverless application by the backend services,
    wherein the application manifest specifies the plurality of stateless functions, the backend services, and the application function mappings, and
    wherein a stateless function interacts with a backend service in executing the serverless application, and an application function mapping comprises a condition under which the stateless function is invoked;
    creating the backup copy of the serverless application by directing each of a backend service listed in the application manifest to create a copy of data associated with the backend service;
    receiving a selection of the backup copy of the serverless application for restoring onto the same compute services platform supporting the first FaaS environment, but in a second FaaS environment, different from the first FaaS environment, on the same compute services platform;
    accessing the application manifest of the serverless application used to create the copy of the serverless application in the first FaaS environment;
    restoring the copy of the serverless application onto the same compute services platform according to the application manifest, the restored copy of the serverless application comprising a restored version of the stateless function, a restored version of the backend service, and a restored version of the application function mapping, wherein upon the restoring, the backend service is accessible to the restored copy of the serverless application; and
    creating the second FaaS environment, on the same compute services platform as the first FaaS environment by changing a condition specified in the restored version of the application function mapping so that the backend service is not accessible to the restored copy of the serverless application, wherein based on the changed condition, the restored version of the stateless function is invoked when the restored version of the backend service performs an operation, and wherein the stateless function of the serverless application in the first FaaS environment and corresponding to the restored version of the stateless function is not invoked.

2. The system of claim 1 wherein the serverless application comprises a first stateless function that calls a second stateless function based on one or more environment variables exposed to the first and second stateless functions and associated with the first FaaS environment, and the processor further carries out the steps of:

after the restoring the copy of the serverless application onto the target platform, replacing one or more restored environment variables exposed to restored versions of the first and second stateless functions with corresponding one or more environment variables that are associated with the second FaaS environment.

3. The system of claim 1 wherein the stateless function runs inside a first container, the restored version of the stateless function runs inside a second container, and the processor further carries out the steps of:

before runtime of the restored version of the stateless function, replacing a first plurality of environment variables that will be exposed to the restored version of the stateless function during the runtime with a second plurality of environment variables, wherein the first plurality of environment variables are associated with the first FaaS environment, and the second plurality of environment variables are associated with the second FaaS environment, and wherein each of the first and second plurality of environment variables comprise one or more of configuration settings, encryption keys, or external resource addresses.

4. The system of claim 1 wherein the application function mapping of the serverless application in the first FaaS environment comprises a condition that specifies invoking the stateless function when the backend service performs an operation involving a component of a particular type, and the changing a condition comprises:

changing a condition in the restored version of the application function mapping to specify invoking the restored version of the stateless function when the restored version of the backend service performs the same operation, but involving a different component of the same particular type.

5. The system of claim 1 wherein the application function mapping of the serverless application in the first FaaS environment comprises a condition that specifies invoking the stateless function when the backend service uploads an object to a first storage bucket, and the changing a condition comprises:

changing a condition in the restored version of the application function mapping to specify invoking the restored version of the stateless function when the restored version of the backend service uploads the object to a second storage bucket, different from the first storage bucket, and wherein the stateless function is not invoked when the restored version of the backend service uploads the object to the second storage bucket because of the changed condition.

6. The system of claim 1 wherein the application function mapping of the serverless application in the first FaaS environment comprises a condition that specifies invoking the stateless function when the backend service writes to a first database, and the changing a condition comprises:

changing a condition in the restored version of the application function mapping to specify invoking the restored version of the stateless function when the restored version of the backend service writes to a second database, different from the first database, and wherein the stateless function is not invoked when the restored version of the backend service writes to the second database because of the changed condition.

7. The system of claim 1 wherein the application function mapping of the serverless application in the first FaaS environment comprises a condition that specifies invoking the stateless function when the backend service sends a message to a first message queue, and the changing a condition comprises:

changing a condition in the restored version of the application function mapping to specify invoking the restored version of the stateless function when the restored version of the backend service sends the message to a second message queue, different from the first message queue, and wherein the stateless function is not invoked when the restored version of the backend service sends the message to the second message queue because of the changed condition.

8. The system of claim 1 wherein the application manifest is a first application manifest and comprises a first graph having a plurality of first nodes corresponding to respective ones of the stateless functions and the backend services, wherein first edges between respective pairs of the first nodes each indicate one of an invocation of a particular one of the backend services by a particular one of the stateless functions or an invocation of a particular one of the stateless functions by a particular one of the backend services, the first edges defining stateless function first mappings, and the processor further carries out the steps of:

after the restoring the copy of the serverless application onto the target platform, generating a second application manifest for the restored copy of the serverless application, wherein the second application manifest comprises a second graph having a plurality of second nodes corresponding to respective ones of restored versions of the stateless functions and restored versions of the backend services, wherein second edges between respective pairs of the second nodes each indicate one of an invocation of a particular one of the restored versions of the backend services by a particular one of the restored versions of the stateless functions or an invocation of a particular one of the restored versions of the stateless functions by a particular one of the restored versions of the backend services, the second edges defining stateless function second mappings, wherein the stateless functions and backend services are the same as corresponding restored versions of the stateless functions and restored versions of the backend services, respectively, and wherein the stateless function first mappings are different from the stateless function second mappings.

9. A method comprising:

reviewing an application manifest associated with a serverless application to create a backup copy of the serverless application, the serverless application executing in a first function-as-a-service (FaaS) environment on a compute services platform that is provided by a cloud vendor and comprising a plurality of stateless functions, packaged as containers, that interact with backend services and are invoked according to application function mappings, wherein data including state of the serverless application is stored external to the serverless application by the backend services, the backend services being provided by a cloud vendor, wherein the application manifest specifies the plurality of stateless functions, the backend services, and the application function mappings, and wherein a stateless function interacts with a backend service in executing the serverless application, and an application function mapping comprises a condition under which the stateless function is invoked;

creating the backup copy of the serverless application by directing each of a backend service listed in the application manifest to create a copy of data associated with the backend service;

receiving a selection of the backup copy of the serverless application for restoring onto the same compute services platform supporting the first FaaS environment, but in a second FaaS environment, different from the first FaaS environment, on the same compute services platform;

accessing the application manifest of the serverless application used to create the copy of the serverless application in the first FaaS environment;

restoring the copy of the serverless application onto the same compute services platform according to the application manifest, the restored copy of the serverless application comprising a restored version of the stateless function, a restored version of the backend service, and a restored version of the application function mapping, wherein upon the restoring, the backend service is accessible to the restored copy of the serverless application; and creating the second FaaS environment, on the same compute services platform as the first FaaS environment, by changing a condition specified in the restored version of the application function mapping so that the backend service is not accessible to the restored copy of the serverless application, wherein based on the changed condition, the restored version of the stateless function is invoked when the restored version of the backend service performs an operation, and wherein the stateless function of the serverless application in the first FaaS environment and corresponding to the restored version of the stateless function is not invoked, and wherein a number of containers in the first FaaS environment within which the stateless functions run is greater than a number of containers in the second FaaS environment within which restored versions of the stateless functions run.

10. The method of claim 9 wherein the stateless function runs inside a first container, the restored version of the stateless function runs inside a second container, and the method comprises:

before runtime of the restored version of the stateless function, replacing a first plurality of environment variables that will be exposed to the restored version of the stateless function during the runtime with a second plurality of environment variables, wherein the first plurality of environment variables are associated with the first FaaS environment, and the second plurality of environment variables are associated with the second FaaS environment, and wherein each of the first and second plurality of environment variables comprise one or more of configuration settings, encryption keys, or external resource addresses.

11. The method of claim 9 wherein the application function mapping of the serverless application in the first FaaS environment comprises a condition that specifies invoking the stateless function when the backend service performs an operation involving a component of a particular type, and the changing a condition comprises:

changing a condition in the restored version of the application function mapping to specify invoking the restored version of the stateless function when the restored version of the backend service performs the same operation, but involving a different component of the same particular type.

12. The method of claim 9 wherein the application function mapping of the serverless application in the first FaaS environment comprises a condition that specifies invoking the stateless function when the backend service uploads an object to a first storage bucket, and the changing a condition comprises:

changing a condition in the restored version of the application function mapping to specify invoking the restored version of the stateless function when the restored version of the backend service uploads the object to a second storage bucket, different from the first storage bucket, and wherein the stateless function is not invoked when the restored version of the backend service uploads the object to the second storage bucket because of the changed condition.

13. The method of claim 9 wherein the application function mapping of the serverless application in the first FaaS environment comprises a condition that specifies invoking the stateless function when the backend service writes to a first database, and the changing a condition comprises:

changing a condition in the restored version of the application function mapping to specify invoking the restored version of the stateless function when the restored version of the backend service writes to a second database, different from the first database, and wherein the stateless function is not invoked when the restored version of the backend service writes to the second database because of the changed condition.

14. The method of claim 9 wherein the application function mapping of the serverless application in the first FaaS environment comprises a condition that specifies invoking the stateless function when the backend service sends a message to a first message queue, and the changing a condition comprises:

changing a condition in the restored version of the application function mapping to specify invoking the restored version of the stateless function when the restored version of the backend service sends the message to a second message queue, different from the first message queue, and wherein the stateless function is not invoked when the restored version of the backend service sends the message to the second message queue because of the changed condition.

15. The method of claim 9 wherein the application manifest is a first application manifest and comprises a first graph having a plurality of first nodes corresponding to respective ones of the stateless functions and the backend services, wherein first edges between respective pairs of the first nodes each indicate one of an invocation of a particular one of the backend services by a particular one of the stateless functions or an invocation of a particular one of the stateless functions by a particular one of the backend services, the first edges defining application function first mappings, and the method comprises:

after the restoring the copy of the serverless application onto the target platform, generating a second application manifest for the restored copy of the serverless application, wherein the second application manifest comprises a second graph having a plurality of second nodes corresponding to respective ones of restored versions of the stateless functions and restored versions of the backend services, wherein second edges between respective pairs of the second nodes each indicate one of an invocation of a particular one of the restored versions of the backend services by a particular one of the restored versions of the stateless functions or an invocation of a particular one of the restored versions of the stateless functions by a particular one of the restored versions of the backend services, the second edges defining application function second mappings, wherein the stateless functions and backend services are the same as the corresponding restored versions of the stateless functions and restored versions of the backend services, respectively, and wherein the application function first mappings are different from the application function second mappings.

16. A computer program product, comprising a non-transitory computer-readable medium having a computer-readable program code embodied therein, the computer-readable program code adapted to be executed by one or more processors to implement a method comprising:

reviewing an application manifest associated with a serverless application to create a backup copy of the serverless application, the serverless application executing in a first function-as-a-service (FaaS) environment on a compute services platform that is provided by a cloud vendor and comprising a plurality of stateless functions, packaged as containers, that interact with backend services and are invoked according to application function mappings, wherein data including state of the serverless application is stored external to the serverless application by the backend services, wherein the application manifest specifies the plurality of stateless functions, the backend services, and the application function mappings, wherein a stateless function interacts with a backend service in executing the serverless application, and an application function mapping comprises a condition under which the stateless function is invoked, and wherein the backup copy of the serverless application is to be stored in a backup repository at the compute services platform;

creating the backup copy of the serverless application by directing each of a backend service listed in the application manifest to create a copy of data associated with the backend service;

receiving a selection of the backup copy of the serverless application for restoring onto the same compute services platform supporting the first FaaS environment, but in a second FaaS environment, different from the first FaaS environment, on the same compute services platform;

accessing the application manifest used to create the copy of the serverless application in the first FaaS environment;

restoring the copy of the serverless application onto the same compute services platform according to the application manifest, the restored copy of the serverless application comprising a restored version of the stateless function, a restored version of the backend service, and a restored version of the application function mapping, wherein upon the restoring, the backend service is accessible to the restored copy of the serverless application; and creating the second FaaS environment, on the same compute services platform as the first FaaS environment, by changing a condition specified in the restored version of the application function mapping so that the backend service is not accessible to the restored copy of the serverless application, thereby allowing the restored copy of the serverless application to be tested and debugged without affecting the serverless application executing in the first FaaS environment, wherein based on the changed condition, the restored version of the stateless function is invoked when the restored version of the backend service performs an operation, and wherein the stateless function of the serverless application in the first FaaS environment and corresponding to the restored version of the stateless function is not invoked.

17. The computer program product of claim 16 wherein the serverless application comprises a first stateless function that calls a second stateless function based on one or more environment variables exposed to the first and second stateless functions and associated with the first FaaS environment, and the method comprises:

after the restoring the copy of the serverless application onto the target platform, replacing one or more restored environment variables exposed to restored versions of the first and second stateless functions with corresponding one or more environment variables that are associated with the second FaaS environment.

18. The computer program product of claim 16 wherein the application function mapping of the serverless application in the first FaaS environment comprises a condition that specifies invoking the stateless function when the backend service uploads an object to a first storage bucket, and the changing a condition comprises:

changing a condition in the restored version of the application function mapping to specify invoking the restored version of the stateless function when the restored version of the backend service uploads the object to a second storage bucket, different from the first storage bucket, and wherein the stateless function is not invoked when the restored version of the backend service uploads the object to the second storage bucket because of the changed condition.

19. The computer program product of claim 16 wherein the application function mapping of the serverless application in the first FaaS environment comprises a condition that specifies invoking the stateless function when the backend service performs an operation involving a component of a particular type, and the changing a condition comprises:

changing a condition in the restored version of the application function mapping to specify invoking the restored version of the stateless function when the restored version of the backend service performs the same operation, but involving a different component of the same particular type.

20. The computer program product of claim 16 wherein the application manifest is a first application manifest and comprises a first graph having a plurality of first nodes corresponding to respective ones of the stateless functions and the backend services, wherein first edges between respective pairs of the first nodes each indicate one of an invocation of a particular one of the backend services by a particular one of the stateless functions or an invocation of a particular one of the stateless functions by a particular one of the backend services, the first edges defining application function first mappings, and the method comprises:

after the restoring the copy of the serverless application onto the target platform, generating a second application manifest for the restored copy of the serverless application, wherein the second application manifest comprises a second graph having a plurality of second nodes corresponding to respective ones of restored versions of the stateless functions and restored versions of the backend services, wherein second edges between respective pairs of the second nodes each indicate one of an invocation of a particular one of the restored versions of the backend services by a particular one of the restored versions of the stateless functions or an invocation of a particular one of the restored versions of the stateless functions by a particular one of the restored versions of the backend services, the second edges defining application function second mappings, wherein the stateless functions and backend services are the same as the corresponding restored versions of the stateless functions and restored versions of the backend services, respectively, and wherein the application function first mappings are different from the application function second mappings.

* * * * *